(12) United States Patent
Chun

(10) Patent No.: US 11,985,621 B2
(45) Date of Patent: May 14, 2024

(54) IMS SIGNALING

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 17/610,605

(22) PCT Filed: Jun. 12, 2020

(86) PCT No.: PCT/KR2020/007621
§ 371 (c)(1),
(2) Date: Nov. 11, 2021

(87) PCT Pub. No.: WO2020/251293
PCT Pub. Date: Dec. 17, 2020

(65) Prior Publication Data
US 2022/0240212 A1    Jul. 28, 2022

(30) Foreign Application Priority Data

Jun. 12, 2019 (KR) .................. 10-2019-0069577

(51) Int. Cl.
*H04L 29/06* (2006.01)
*H04L 65/1016* (2022.01)
(Continued)

(52) U.S. Cl.
CPC ......... *H04W 60/04* (2013.01); *H04L 65/1016* (2013.01); *H04L 65/1045* (2022.05); *H04W 4/16* (2013.01); *H04W 8/183* (2013.01); *H04W 68/02* (2013.01); *H04W 68/12* (2013.01); *H04W 80/10* (2013.01); *H04W 88/06* (2013.01)

(58) Field of Classification Search
None
See application file for complete search history.

(56) References Cited

U.S. PATENT DOCUMENTS 9,157,752 B1    10/2015  Fernandez et al.
9,344,877 B1    5/2016   Arugonda et al.
(Continued)

FOREIGN PATENT DOCUMENTS

WO    2018-145013 A1    8/2018

OTHER PUBLICATIONS

Convida Wireless LLC., Fixing Incorrect References to the Service Request Procedures, S2-183107, 3GPP TSG-SA WG2 Meeting #127, Sanya, P. R. China, Apr. 10, 2018, pp. 2-4.
(Continued)

*Primary Examiner* — Gary Lafontant
(74) *Attorney, Agent, or Firm* — BRYAN CAVE LEIGHTON PAISNER LLP

(57) ABSTRACT

One disclosure of the present specification provides a method for a network node to perform communication related to an IMS. The method may include: a step for receiving first information indicating that a terminal is requesting information related to an incoming IMS service; a step for receiving an SIP message related to the IMS service for the terminal; a step for transmitting second information related to the incoming IMS service for the terminal; and a step for transmitting the SIP message to a UPF node.

13 Claims, 20 Drawing Sheets

(51) Int. Cl.
*H04L 65/1045* (2022.01)
*H04W 4/16* (2009.01)
*H04W 8/18* (2009.01)
*H04W 60/04* (2009.01)
*H04W 68/02* (2009.01)
*H04W 68/12* (2009.01)
*H04W 76/12* (2018.01)
*H04W 80/10* (2009.01)
*H04W 88/06* (2009.01)

(56) References Cited

U.S. PATENT DOCUMENTS

2017/0325130 A1 11/2017 Purohit et al.
2020/0358830 A1* 11/2020 Saghir ................. H04L 65/1073

OTHER PUBLICATIONS

Motorola Mobility , Update of solution 11, S2-185555, SA WG2 Meeting #127-bis, New Port Beach, CA, USA, Jun. 2, 2018, pp. 3-7.
International Search Report from PCT/KR2020/007621, dated Sep. 9, 2020.
Written Opinion of the ISA from PCT/KR2020/007621, dated Sep. 9, 2020.

* cited by examiner

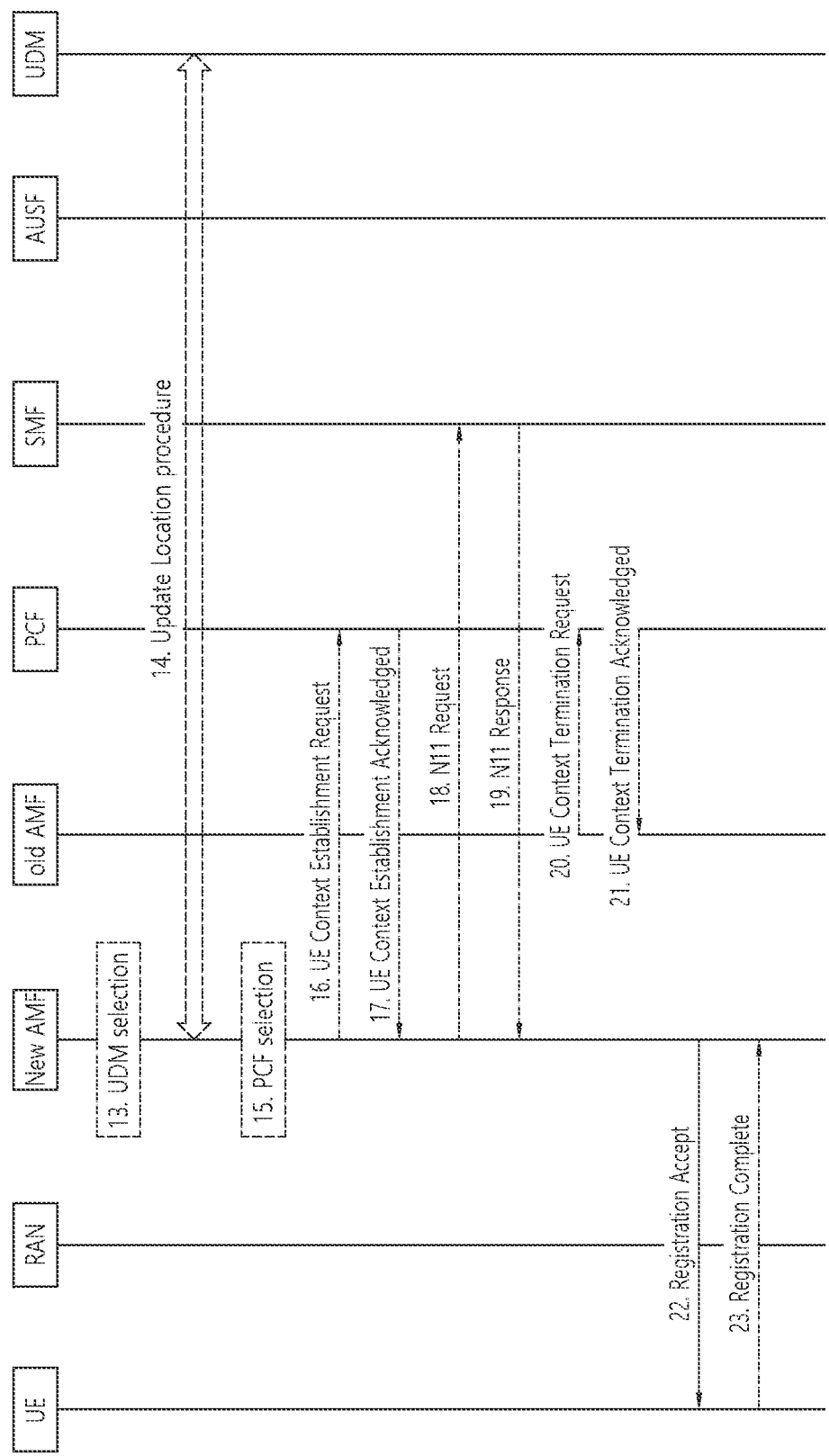

IMS SIGNALING

CROSS-REFERENCE TO RELATED APPLICATIONS

This application is the National Stage filing under 35 U.S.C. § 371 of International Application No. PCT/KR2020/007621, filed on Jun. 12, 2020, and claims priority to and the benefits of Korean Application No. 10-2019-0069577, filed on Jun. 12, 2019, all of which are incorporated by reference in their entirety herein.

TECHNICAL FIELD

The present disclosure generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

A terminal using a 3rd Generation Partnership Project (3GPP) system including LTE and 5G may be provided with IMS (IP Multimedia Subsystem) services such as voice call, video call, and Short Message Service (SMS) (eg, SMS over IP (Internet Protocol)).

A plurality of SIM cards (eg, a first SIM card and a second SIM card) may be mounted in a terminal supporting a multi-SIM (subscriber identification module). The terminal may provide a service to the user using a system connected to the first SIM card (eg, a first system of a first operator) and a system connected to a second SIM card (eg, a second system of a second operator).

For example, the terminal may perform data communication in a system connected to the first SIM card (eg, the first system of the first operator). While the terminal performs data communication in the first system, data may be transmitted from a system connected to the second SIM card (eg, a second system of a second operator) to the terminal. That is, there may be a case in which data is received from the second system while the terminal performs data communication in the first system. In order for the terminal to receive data from the second system, the terminal needs to receive a paging message from the second system.

However, conventionally, networks and terminals do not know which data or which service the paging message is associated with. Due to this, the network and the terminal could not effectively process the paging message.

In addition, the paging message is received by a plurality of terminals, and personal information such as sensitive information included in the paging message may be transmitted to terminals other than the called terminal. This allowed the paging message to be exploited.

SUMMARY

Accordingly, a disclosure of the present specification has been made in an effort to solve the aforementioned problem.

In order to solve the above problems, one disclosure of the present specification provides a method for a network node to perform IMS-related communication. The method includes: receiving first information indicating that the terminal requests information related to an incoming IMS service; receiving a SIP message related to the IMS service for the terminal; transmitting second information related to the incoming IMS service to the terminal; and transmitting the SIP message to the UPF node.

In order to solve the above problems, one disclosure of the present specification provides a method for an AMF node to perform IMS-related communication. The method includes: receiving information related to an incoming IMS service for a terminal from an SMF node; Receiving a data notification message from the UPF node; and transmitting a paging message to the terminal based on the reception of the data notification message, wherein the paging message may include information related to an incoming IMS service for the terminal.

In order to solve the above-described problem, one disclosure of the present specification provides a method for a terminal to perform IMS-related communication. The method includes: performing a registration procedure for a plurality of networks associated with each of the plurality of SIMs based on the plurality of SIMs; Receiving a paging message from a base station, wherein the paging message includes first information on which service the paging is due to for the terminal; determining whether to respond to the paging message based on the first information and information on a service currently being used by the terminal; and transmitting a response message to the paging message.

In order to solve the above problems, one disclosure of the present specification provides a network node. The network node may include: at least one processor; and at least one memory that stores instructions and is operably electrically connectable with the at least one processor, wherein the instructions are executed based on execution by the at least one processor. The operation may include: receiving first information indicating that the terminal requests information related to an incoming IMS service; receiving a SIP message related to the IMS service for the terminal; transmitting second information related to the incoming IMS service for the terminal; and transmitting the SIP message to the UPF node. In order to solve the above-described problem, one disclosure of the present specification provides a network node. The network node may include: at least one processor; and at least one memory that stores instructions and is operably electrically connectable with the at least one processor, wherein the instructions are executed based on execution by the at least one processor. The operations include: receiving information related to the incoming IMS service for the terminal from the SMF node; Receiving a data notification message from the UPF node; and transmitting a paging message to the terminal based on the reception of the data notification message, wherein the paging message may include information related to an incoming IMS service for the terminal.

In order to solve the above problems, one disclosure of the present specification provides a wireless communication device. The network node may include: at least one processor; and at least one memory that stores instructions and is operably electrically connectable with the at least one processor, wherein the instructions are executed based on execution by the at least one processor. The operations may include: performing a registration procedure for a plurality of networks related to each of the plurality of SIMs based on the plurality of SIMs; Receiving a paging message from a base station, wherein the paging message includes first information on which service the paging is due to for the terminal; determining whether to respond to the paging message based on the first information and information on a service currently being used by the terminal; and transmitting a response message to the paging message.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 5a and 5b is a signal flow chart showing an exemplary registration procedure.

DESCRIPTION OF EXEMPLARY EMBODIMENTS

Figure 1:
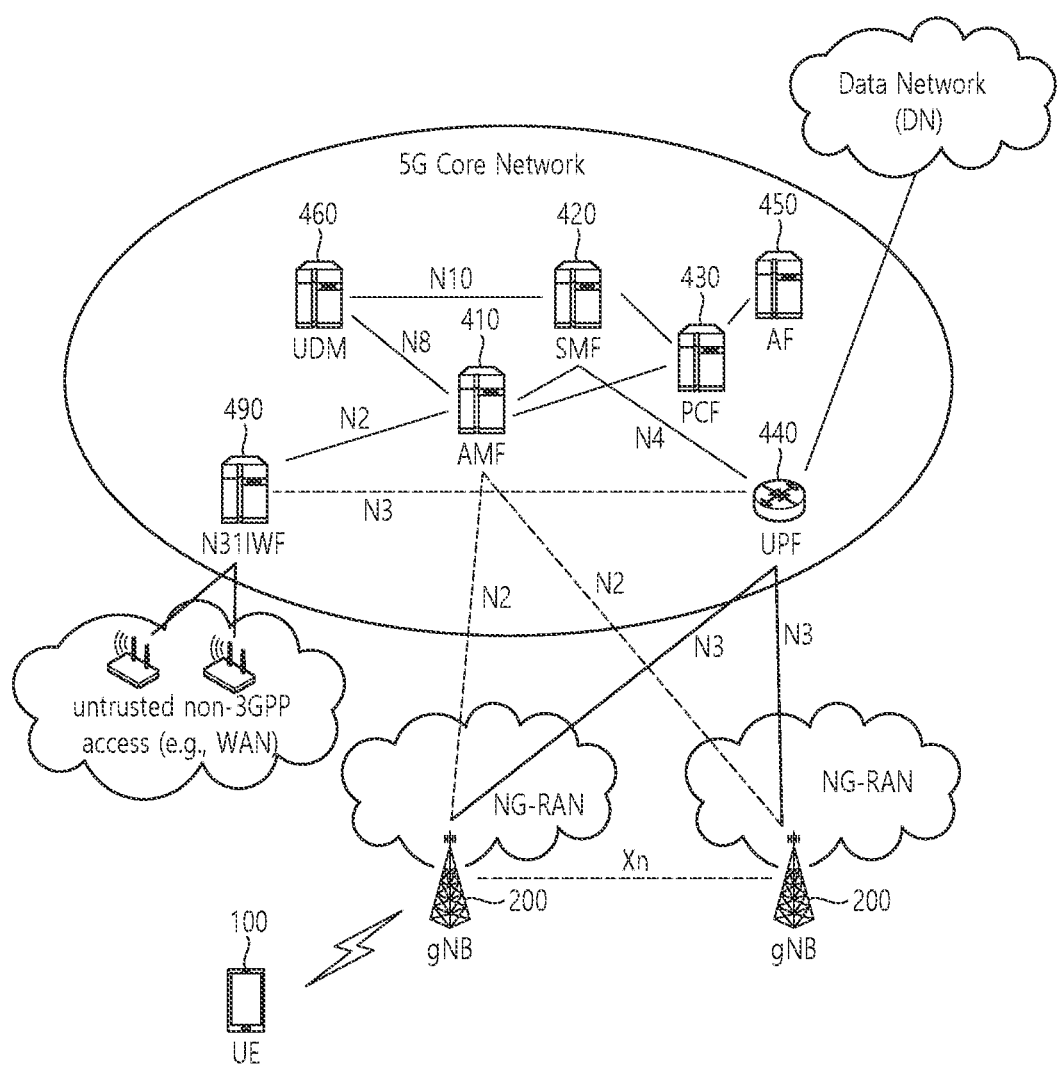
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B".

Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 41, a session management function (SMF) 42, a policy control function (PCF) 43, a User Plane Function (UPF) 44, an application function (AF) 45, a unified data management (UDM) data network 46, and a non-3GPP interworking function (N3IWF) 49.

A UE 10 is connected to a data network via the UPF 44 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 49 may be deployed.

The illustrated N3IWF 49 performs a function of managing interworking between the non-3GPP access and the 5G system. When the UE 10 is connected to non-3GPP access (e.g., WiFi referred to as IEEE 801.11), the UE 10 may be connected to the 5G system through the N3IWF 49. The N3IWF 49 performs control signaling with the AMF 41 and is connected to the UPF 44 through an N3 interface for data transmission.

The illustrated AMF 41 may manage access and mobility in the 5G system. The AMF 41 may perform a function of managing NAS security. The AMF 41 may perform a function of handling mobility in an idle state.

The illustrated UPF 44 is a type of gateway through which user data is transmitted/received. The UPF 44 may perform the entirety or a portion of a user plane function of a serving gateway (S-GW) and a packet data network gateway (P-GW) of 4G mobile communication.

The UPF 44 operates as a boundary point between a next generation radio access network (NG-RAN) and the core network and maintains a data path between the gNB 20 and the SMF 42. In addition, when the UE 10 moves over an area served by the gNB 20, the UPF 44 serves as a mobility anchor point. The UPF 44 may perform a function of handling a PDU. For mobility within the NG-RAN (which is defined after 3GPP Release-15), the UPF 44 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 43 is a node that controls an operator's policy.

The illustrated AF 45 is a server for providing various services to the UE 10.

The illustrated UDM 46 is a kind of server that manages subscriber information, such as home subscriber server (HSS) of 4G mobile communication. The UDM 46 stores and manages the subscriber information in a unified data repository (UDR).

The illustrated SMF 42 may perform a function of allocating an Internet protocol (IP) address of the UE. In addition, the SMF may control a protocol data unit (PDU) session.

For reference, hereinafter, reference numerals for AMF (41), SMF (42), PCF (43), UPF (44), AF (45), UDM (46), N3IWF (49), gNB (20), or UE (10) may be omitted.

The $5^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
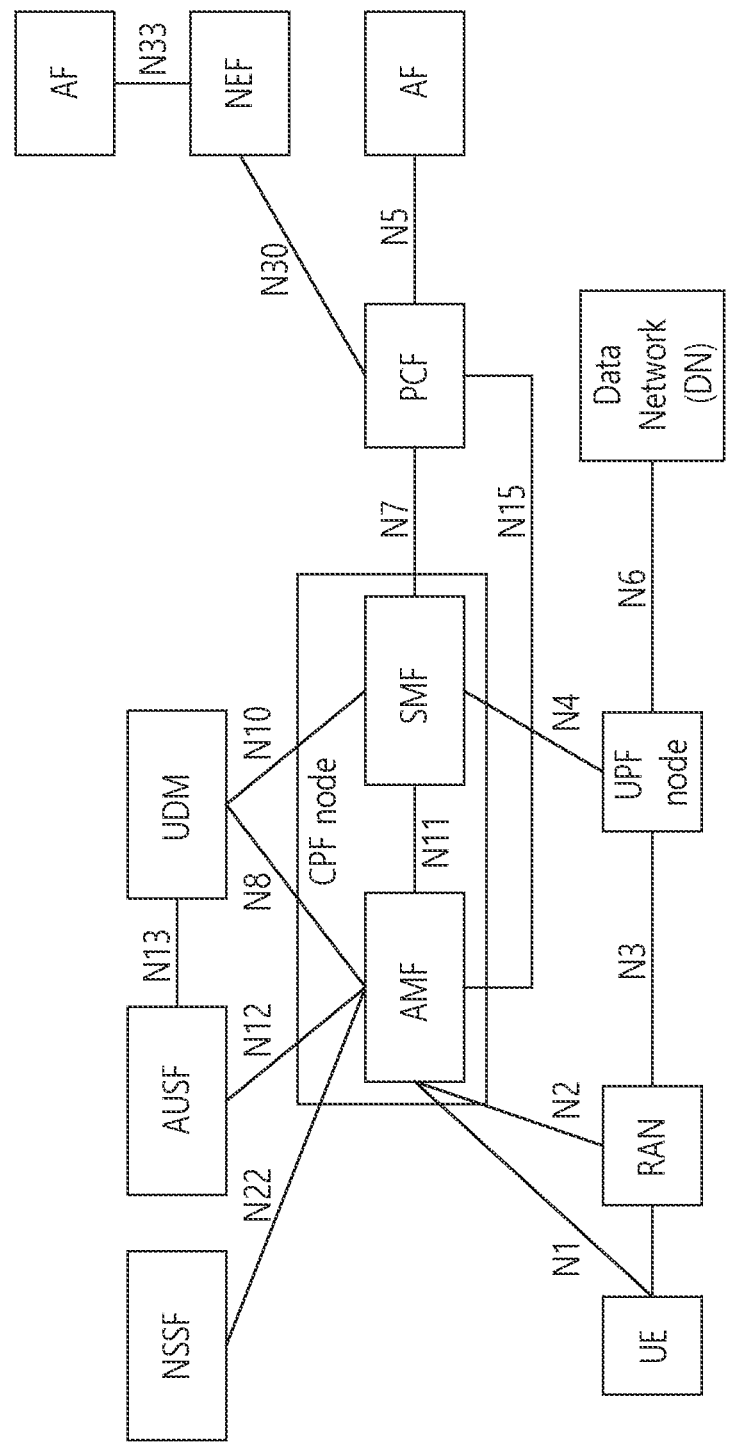
FIG. 2 is an exemplary diagram illustrating a predicted structure of a next generation mobile communication in terms of a node.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
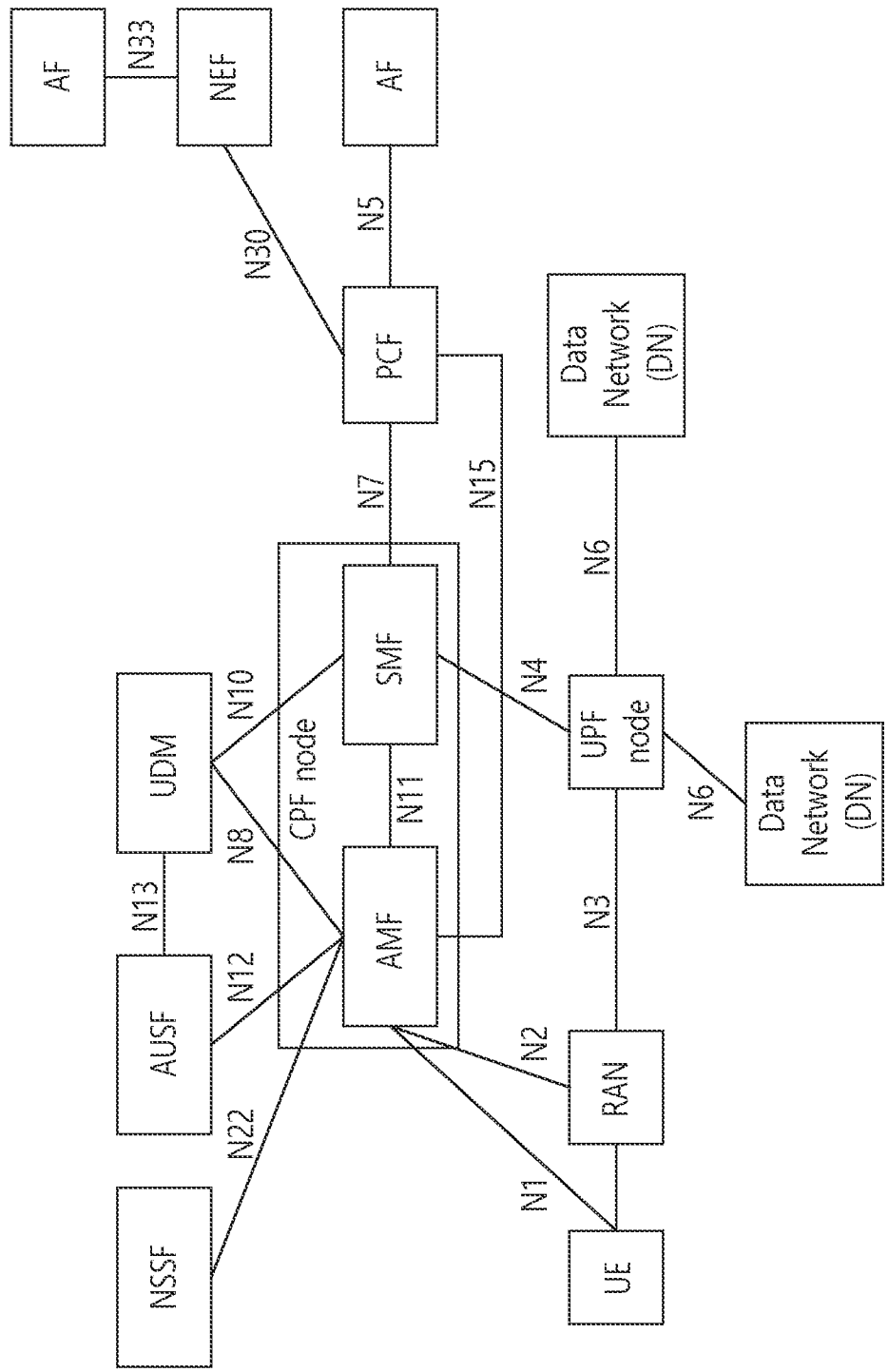
FIG. 3 is an exemplary diagram illustrating an architecture for supporting a concurrent access through two data networks.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
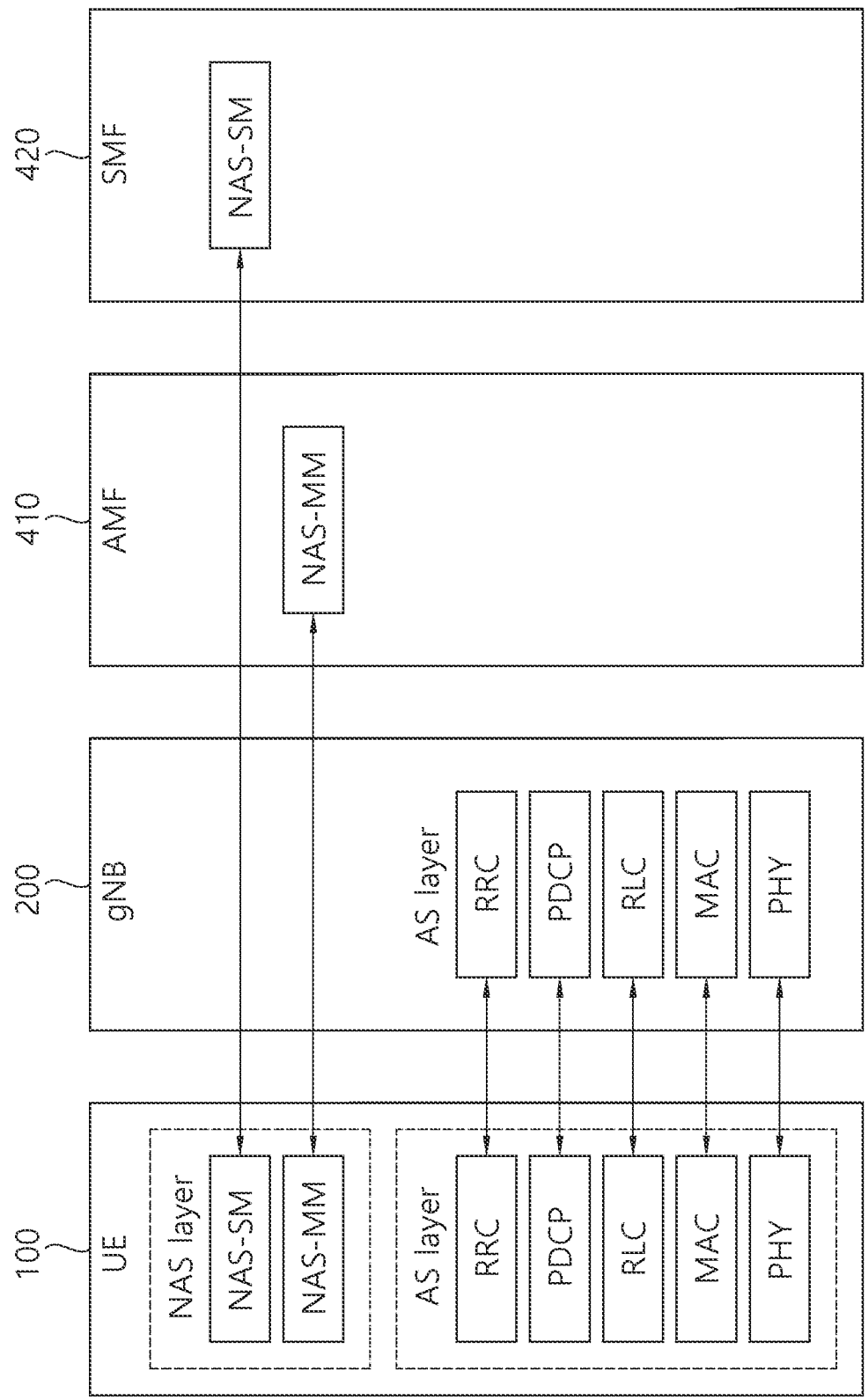
FIG. 4 is another exemplary diagram showing a structure of a radio interface protocol between a UE and a gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
NAS procedures related to AMF include the following.
Registration management and access management procedures. AMF supports the following functions.
Secure NAS signal connection between UE and AMF (integrity protection, encryption)
2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5A:
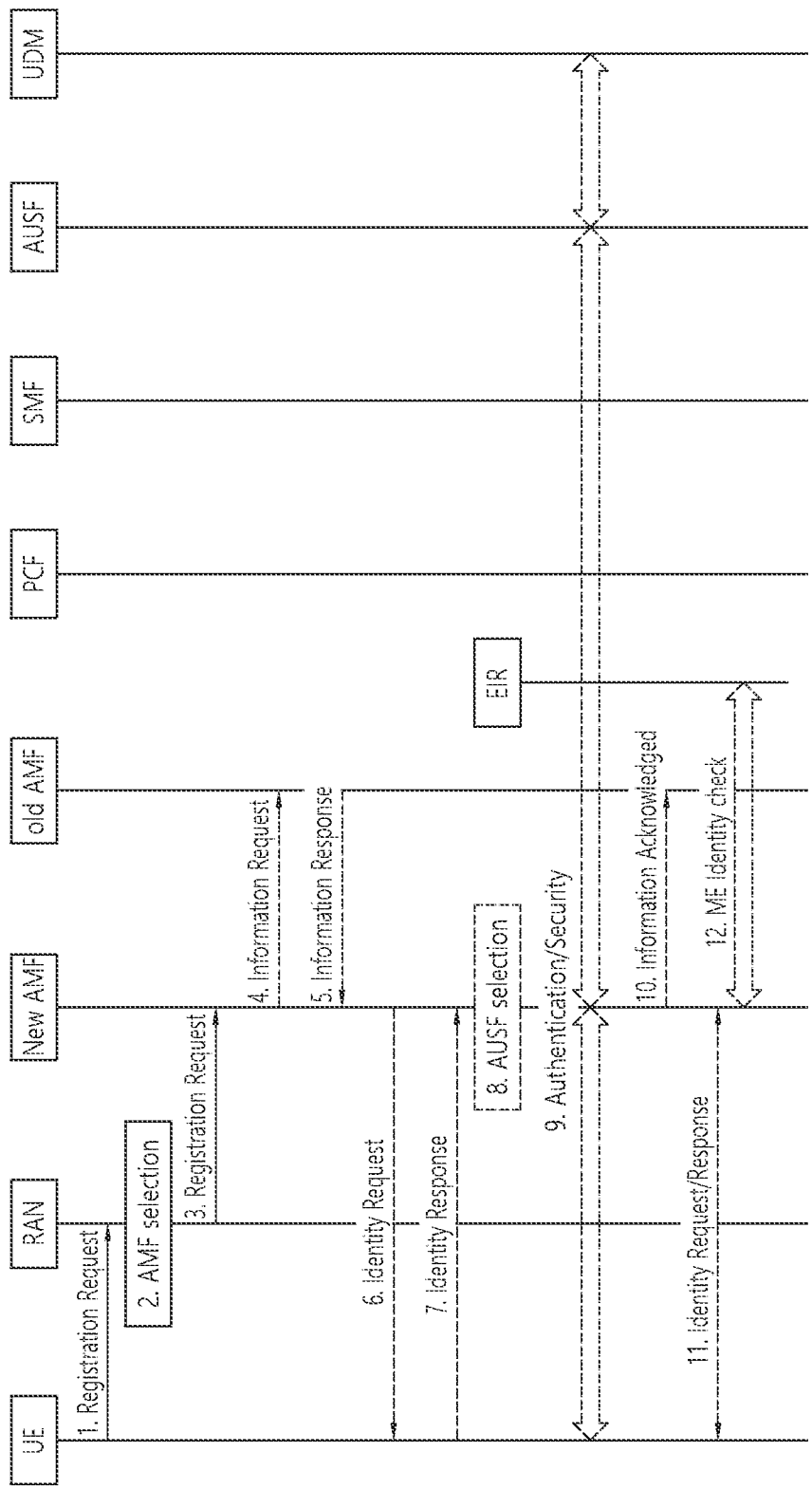

FIGS. 5*a* and 5*b* are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer).

In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF.

The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session

Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
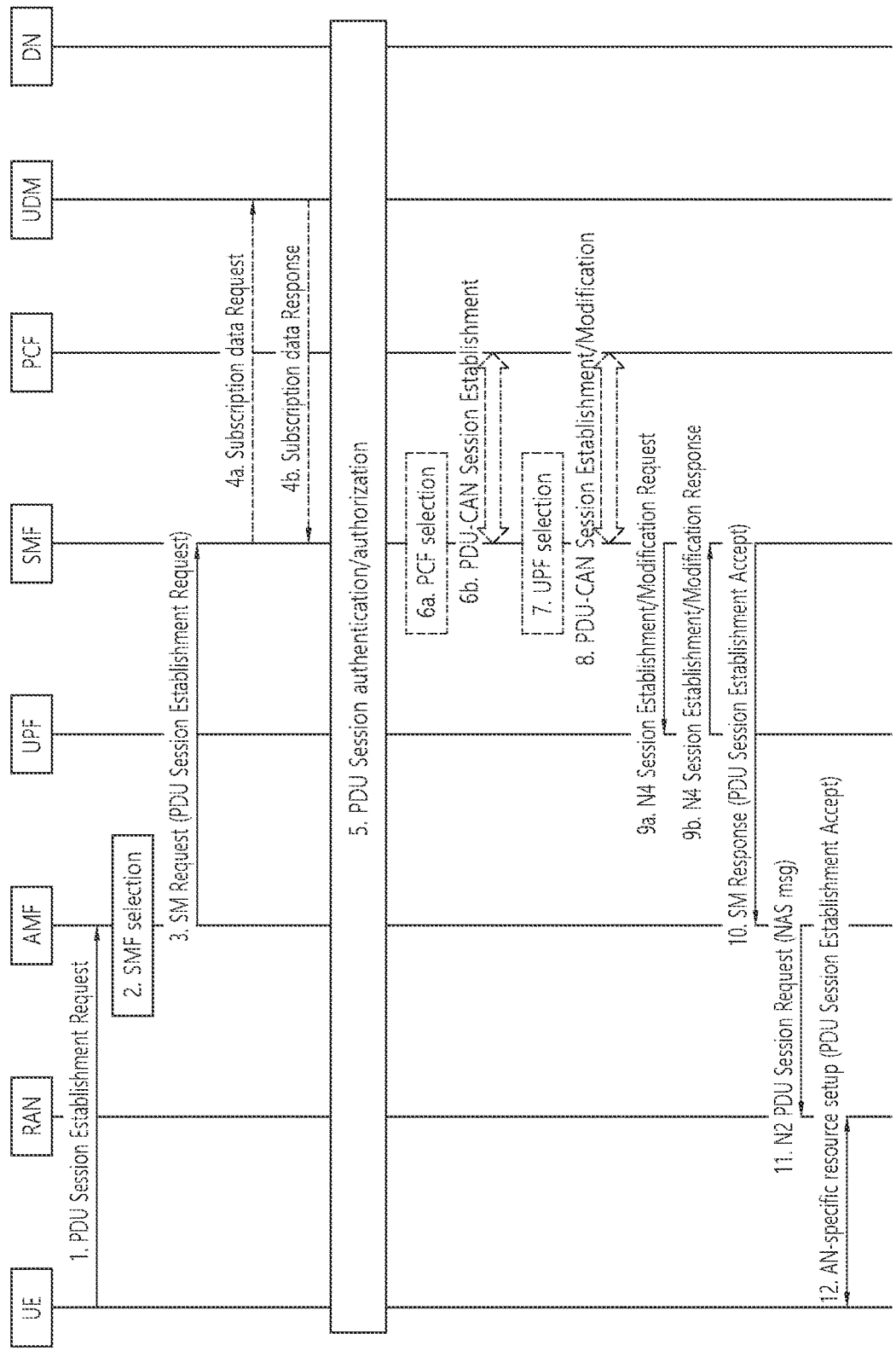
FIGS. 6A and 6B is a signal flowchart illustrating an exemplary PDU session establishment procedure.
Figure 6B:
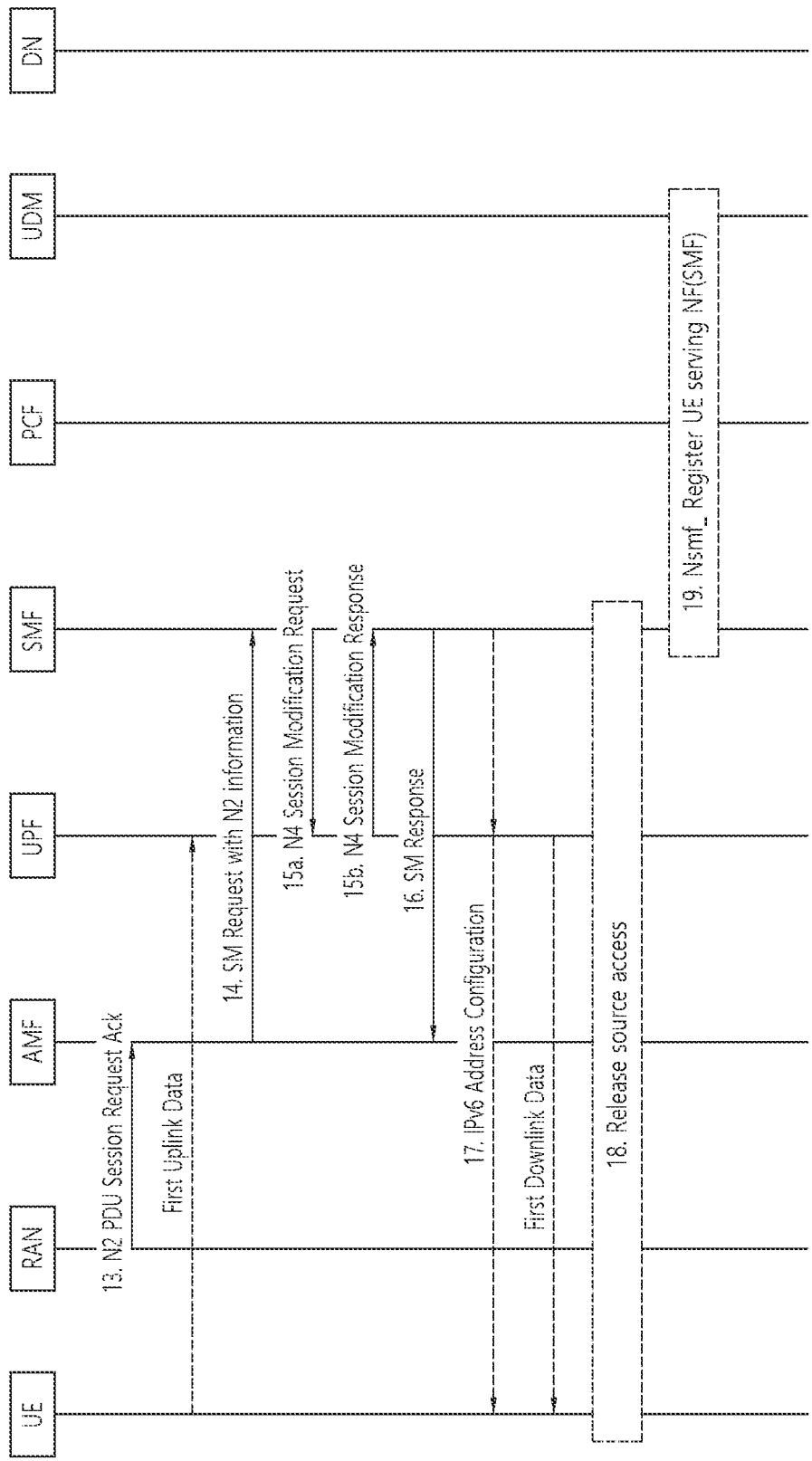

FIGS. 6A and 6B are a signal flowchart illustrating an exemplary PDU session establishment procedure.

The procedure shown in FIGS. 6A and 6B assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<Service Request Procedures>

The service request procedure is used to request establishment of a secure connection to AMF by a UE or a 5G core network (5GC). The service request procedure is used to activate the user plane connection of the established PDU session even when the UE is in a CM-IDLE state and a CM-CONNECTED state. For reference, in order to reflect NAS signaling connection between the AMF and the UE, two CM states of the CM-IDLE state and the CM-CONNECTED state are used.

The UE does not initiate a service request procedure if there is an ongoing service request procedure.

The service request procedure includes a service request procedure initiated by the UE (i.e., a UE triggered service request) and a service request procedure initiated by the network (i.e., a network triggered service request).

Figure 7:
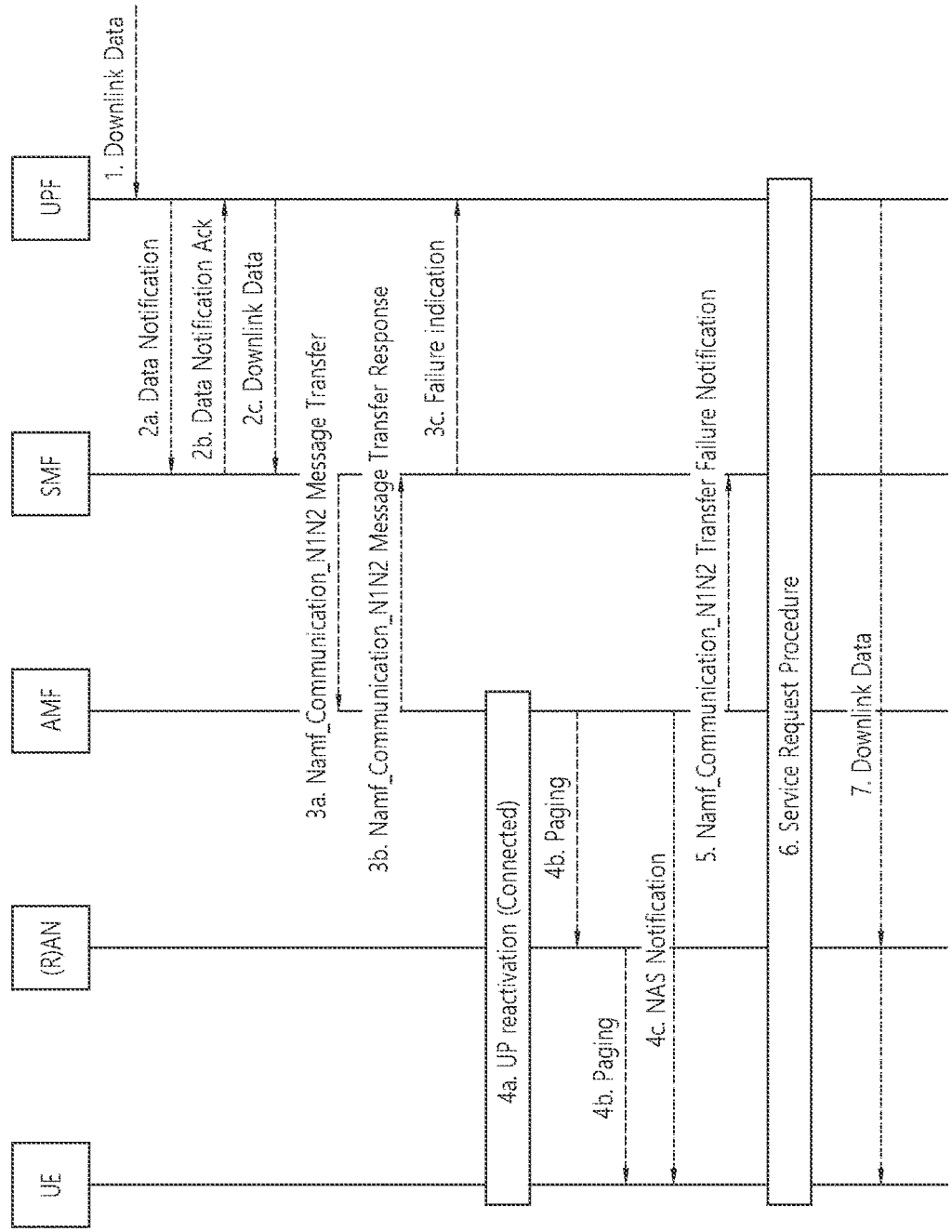
FIG. 7 is a signal flowchart illustrating an exemplary network initiated service request procedure.

For reference, FIG. 7 illustrates paging when data arrives at the terminal from an external Internet network to a mobile communication network based on an exemplary network initiation service request procedure. Although operations are described based on 5GS in FIG. 7, a similar mechanism may be used in the EPS network.

Hereinafter, an example of a network initiation service request procedure will be described with reference to FIG. 7. The service request procedure described in FIG. 7 is only an example, and in the disclosure of this specification, the service request procedure may include all types of service request procedures initiated by the UE and all types of service request procedures initiated by the network.

FIG. 7 is a signal flowchart illustrating an exemplary network initiated service request procedure.

The network initiated service request procedure is used when there is a need for activating a user plane for the PDU session to transfer signaling (e.g., N1 signaling to the UE, mobile-terminated short message service (SMS)), mobile terminating (a destination of data is UE) user data with the UE.

When the network initiated service request procedure is triggered by a short message service function (SMSF), PCF, location management function (LMF), gateway mobile location center (GMLC), NEF or UDM, the SMF in FIG. 7 may be replaced by a corresponding NF. For example, when the network initiated service request procedure is triggered by the PCF, the PCF may perform operations performed by the SMF of FIG. 7.

When the UE is in the CM-IDLE state or the CM-CONNECTED state in 3GPP access, the network initiates a network service request procedure.

When the UE is in the CM-IDLE state and asynchronous type communication is not activated, the network may transmit a paging request to the (R)AN/UE. The paging request triggers a UE initiated service request procedure in the UE. When asynchronous type communication is activated, the network stores the received message, and when the UE enters the CM-CONNECTED state, the network may transfer the received message to the (R)AN and/or the UE.

When the UE is in the CM-IDLE state in non-3GPP access and the UE is simultaneously registered for 3GPP access and non-3GPP access in one public land mobile network (PLMN), the network may initiate the network initiated service request procedure via 3GPP access.

When the UE is in the CM-IDLE state in 3GPP access, in the CM-CONNECTED state in non-3GPP access, and the UE is simultaneously registered for 3GPP access and non-3GPP access in one PLMN, the network may initiate the network initiated service request procedure through 3GPP access.

In the network initiated service request procedure, both SMF and UPF belong to a PLMN serving the UE. For example, in a home routed roaming case, the SMF and UPF of a HPLMN are not affected by a service request procedure (that is, the SMF and UPF of the HPLMN are not involved in the service request procedure).

The procedure of FIG. 7 deals with a non exhaustive list of use-cases for 3GPP access as follows (detailed conditions to which each step is applied are described in the procedure below):

When the SMF needs to set up an N3 tunnel in order to deliver a downlink packet for a PDU session to the UE and the UE is in the CM-IDLE state: Step 3a includes an N2 message and step 4b (paging) may be performed.

When the SMF needs to set up an N3 tunnel in order to deliver a downlink packet for a PDU session to the UE and the UE is in a CM-CONNECTED state: Step 3a includes an N2 message and step 4a (UP activation) may be performed.

If an NF (e.g., SMF, SMSF, LMF or NEF) needs to transmit an N1 message to the UE and the UE is in the CM-IDLE state: Step 3a includes an N1 message, step 3b includes a cause "Attempting to reach UE", and step 4b (paging) occurs.

When the NF (e.g., SMSF, PCF, or UDM) triggers the AMF to set up a NAS connection with the UE and the UE is in the CM-IDLE state: Trigger differ according to procedures, step 4b (paging) is occurs.

1) When the UPF receives downlink data for the PDU session and AN tunnel information for the PDU session is not stored in the UPF, the UPF may buffer the downlink data or transfer the downlink data to the SMF based on an instruction received from the SMF.

2a) Signaling from the UPF to the SMF: The UPF may transmit a data notification to the SMF. The data notification may include an N4 session ID, information for identifying a QoS flow for a DL data packet, and DSCP.

When the first downlink data for a certain QoS flow arrives, if the SMF has not previously informed the UPF not to transmit a data notification to the SMF, the UPF may transmit a data notification message to the SMF. For reference, if the SMF previously informs the UPF not to transmit the data notification to the SMF, follow-up steps may be omitted.

When the UPF receives a downlink data packet for a different QoS flow in the same PDU session, the UPF may transmit another data notification message to the SMF.

When a paging policy differentiation feature is supported by the UPF and a PDU session type is IP, the UPF may include a DSCP of a TOS (Type of Service)(IPv4)/TC (Traffic Class)(IPv6) received from an IP header of the downlink data packet and information for identifying QoS flows for DL data packets in the data notification.

2b) Signaling from SMF to UPF: A data notification Ack may be transmitted.

2c) When the SMF instructs the UPF that it will buffer the data packet, the UPF may deliver the downlink data packet to the SMF.

When the paging policy differentiation feature is supported by the SMF, the SMF may determine a paging policy indication based on the DSCP of the TOS(IPv4)/TC(IPv6) value received from the IP header of the downlink data packet and identify a QFI of the QoS flow for the DL data packet.

3a) [Conditional operation] i) Signaling from SMF to AMF: The SMF may transmit a Namf_Communication_N1N2MessageTransfer (including SUPI, PDU session ID, N2 SM information (including QFI(s), QoS profile(s), CN N3 tunnel information, S-NSSAI, and paging policy indication), area of validity for N2 SM information, ARP (Allocation and Retention Priority) including paging policy indication, 5QI and N1N2TransferFailure notification target address) to the AMF. Or, ii) signaling from NF to AMF: NF may transmit Namf_Communication_N1N2MessageTransfer (including SUPI and N1 messages) to the AMF.

Upon receiving the data notification message, the SMF may perform an operation to support the LADN for a PDU session corresponding to the LADN. The SMF may notify the UPF that transmitted the data notification to discard downlink data for the PDU session and/or not to provide an additional data notification message.

In other cases, the SMF may determine whether to contact the AMF. The SMF may not contact the AMF in the following cases:

If the SMF previously notified that the UE is unreachable; or

If the UE is reachable only for a regulatory prioritized service and the PDU session is not a regulatory prioritized service.

The SMF determines the AMF, and the SMF may invoke Namf_Communication_N1N2MessageTransfer to the AMF by including the PDU session ID derived from the N4 session ID received in step 2a.

If the SMF receives any additional data notification message or downlink data packet while waiting for the user plane connection to be activated and if the SMF buffers a data packet for a QoS flow related to a priority (e.g., ARP priority level) higher than the priority related to the previous data notification message or downlink data packet, the SMF may invoke a new Namf_Communication_N1N2MessageTransfer indicating a higher priority ARP and PDU session ID to the AMF.

When the SMF receives a message from a new AMF (not the AMF to which the SMF previously called theNamf_Communication_N1N2MessageTransfer), while waiting for the user plane connection to be activated, the SMF may re-invoke Namf_Communication_N1N2MessageTransfer to the new AMF.

When supporting paging policy differentiation, the SMF may show a 5QI related to QFI of step 2a, packet received in step 2c, or a paging policy indication related to downlink data received from ARP or UPF or downlink data triggered a data notification message in the Namf_Communication_N1N2MessageTransfer.

NOTE 1: The AMF may receive a request message to perform signaling to the UE/RAN (e.g., network-initiated deregistration, SMF initiated PDU session modification, etc.) from other network functions (NFs). When the UE is in the CM-CONNECTED state and the AMF delivers only an N1 message to the UE, the flow continues in step 6 below.

N2 SM information is optional. For example, when the SMF intends to transmit a PDU session modification command only to update the UE to the PCO, N2 SM information may be optional.

3b) [Conditional operation] The AMF may respond to the SMF.

If the UE is in the CM-IDLE state for the AMF and the AMF may page the UE, the AMF may directly transmit a Namf_Communication_N1N2MessageTransfer response to the SMF with the cause "Attempting to reach UE". The cause "Attempting to reach UE" may indicate to the SMF that the N2 SM information provided in step 3a may be ignored by the AMF if the UE is reachable and that the SMF is requested to provide the N2 SM information again.

While waiting for the UE to respond to the previous paging request, when the AMF receives a Namf_Communication_N1N2MessageTransfer request message having the same priority or lower priority as the previous message triggering paging or when the AMF determines not to trigger an additional paging request for the UE based on a local policy, the AMF may reject the Namf_Communication_N1N2MessageTransfer request message.

When the UE is in the CM-CONNECTED state in the AMF, the AMF may immediately transmit a Namf_Communication_N1N2MessageTransfer response to the SMF with a "N1/N2 transfer success" cause.

If the UE is in the CM-IDLE state and the AMF determines that the UE is not reachable for paging, the AMF may transmit a Namf_Communication_N1N2MessageTransfer response to the SMF or other network functions (NF transmitting the request message to the AMF in step 3a). Alternatively, the AMF may perform asynchronous type communication and store UE context based on the received message. When asynchronous type communication is invoked, when the UE is reachable (e.g., when the UE enters the CM-CONNECTED state), the AMF may initiate communication with the UE and the (R)AN.

When the AMF determines that the UE is not reachable for the SMF (e.g., as the UE is in a mobile initiated connection only (MICO) mode or the UE is registered only through non-3GPP access and the UE is in the CM-IDLE state), the AMF may reject the request from the SMF. When the SMF does not subscribe to a UE reachability event, the AMF may include an indication (indication that the SMF does not need to trigger a Namf_Communication_N1N2MessageTransfer request for the AMF) in the rejection message. The AMF may store the indication that the SMF has been informed that the UE is not reachable.

When the UE is not in the MICO mode and the AMF detects that the UE is in a non-allowed Area, the AMF may reject a request from the SMF and notify the SMF that the UE is reachable only for the regulatory prioritized service, unless the request from the SMF is for the regulation priority service. The AMF may store the indication that the SMF has been informed that the UE is only reachable for the regulatory prioritized service.

If a registration procedure with an AMF change is in progress when a previous AMF receives Namf_Communication_N1N2MessageTransfer, the previous AMF may reject the request with an indication that Namf_Communication_N1N2MessageTransfer has been temporarily rejected.

When a Namf_Communication_N1N2MessageTransfer response is received with the indication that the request has been temporarily rejected, the SMF may start a locally set guard timer and may wait until a random message comes from the AMF. When a message from the AMF is received, the SMF may re-call Namf_Communication_N1N2MessageTransfer (together with N2 SM information) to the AMF that transmitted the message. In other cases, the SMF may perform step 3a when the guard timer expires. If the SMF determines that control region buffering is applied, the SMF may request the UPF to start transmitting a downlink data PDU to the SMF.

3c) [Conditional operation] SMF may respond to UPF. For example, the SMF may transmit a failure indication to the UPF.

The SMF may notify the UPF of a user plane setup failure.

When the SMF receives an indication that the UE is not reachable or that the UE is reachable only for the regulation priority service from the AMF, the SMF may perform the following operation based on the network policy:

The SMF may instruct the UPF to stop sending data notifications;

The SMF may instruct the UPF to stop buffering the DL data and discard the buffered data;

The SMF may instruct the UPF to stop sending data notifications, stop buffering DL data, and discard the buffered data; or While the UE is not reachable, the SMF suppresses transmitting an additional Namf_Communication_N1N2MessageTransfer message for DL data.

Based on the operator policy, the SMF may apply a suspension of the charging procedure.

When the SMF receives an indication from the AMF that the Namf_Communication_N1N2MessageTransfer requested by the SMF has been temporarily rejected, the SMF may instruct the UPF to apply temporary buffering based on the network policy.

4a) [Conditional operation] When the UE is in the CM-CONNECTED state in the access related to the PDU session ID received from the SMF in step 3a, steps 12 to 22 of FIGS. 8A to 8C may be performed without transmitting a paging message to the (R)AN node and the UE to activate the user plane connection for the PDU session (e.g., radio resources and N3 tunnels may be established). In step 12 of FIGS. 8A to 8C, the AMF may not transmit a NAS service acceptance message to the UE. Parts other than steps 12 to 22 of FIGS. 8A to 8C may be omitted.

4b) [Conditional operation] Even when the UE is in the CM-IDLE state in 3GPP access, the PDU session ID received from the SMF in step 3a is related to the 3GPP access, and the UE is in the CM-CONNECTED state for non-3GPP access, if the AMF determines to notify the UE through 3GPP access based on the local policy, the AMF may transmit a paging message to the NG-RAN node through 3GPP access.

When the UE is simultaneously registered through 3GPP access and non-3GPP access in the same PLMN, the UE is in the CM-IDLE state in 3GPP access and non-3GPP access mode, and the PDU session ID of step 3a is related to the non-3GPP access, the AMF may transmit a paging message related to the access "non-3GPP" to the NG-RAN node through 3GPP access.

When the UE is in RM (Registration Management)-REGISTERED state and CM-IDLE state and the UE is reachable in 3GPP access, the AMF may transmit a paging message (including NAS ID for paging, registration area list, paging DRX length, paging priority indication, and access associated to the PDU session) to the (R)AN node belonging to the registration area in which the UE is registered. When the paging message is received from the AMF, the NG-RAN node may page the UE by including access related to the PDU session in the paging message.

For reference, two RM states of an RM-DEREGISTERED state and an RM-REGISTERED state are used in the UE and the AMF to reflect the registration state of the UE in the PLMN.

When supporting paging differentiation, the paging strategy may be set in the AMF for different combinations of DNN, paging policy indication, ARP, and 5QI.

For the RRC-inactive state, a paging strategy may be set in (R)AN for other combinations of paging policy indication, ARP, and 5QI.

The paging priority indication may be included only in the following cases:
- When the AMF receives a Namf_Communication_N1N2MessageTransfer message including an ARP value related to priority services (e.g., MPS, MCS) set by an operator.
- One paging priority level may be used for multiple ARP values. Mapping of the ARP value for the paging priority level may be set in the AMF and NG-RAN according to an operator policy.

The (R)AN may prioritize paging of the UE according to the paging priority indication (or paging policy indicator).

While waiting for a response from the UE to the paging request message transmitted without a paging priority indication (or paging policy indicator), if the AMF receives a Namf_Communication_N1N2MessageTransfer message indicating an ARP value related to the priority service (e.g., MPS, MCS) set by the operator, the AMF may transmit another paging message together with an appropriate paging priority (or paging policy indicator). For the Namf_Communication_N1N2MessageTransfer message received later having the same priority or higher priority, the AMF may determine whether to transmit a paging message with an appropriate paging priority based on the local policy.

Paging strategies may include the following:
- Paging retransmission scheme (e.g., how often paging is repeated or at what time interval paging is repeated);
- Determine whether to transmit a paging message to the (R)AN node during specific AMF high load conditions;
- Whether to apply sub-area-based paging (e.g., first paging in the last known cell-id or TA and retransmission in all registered TAs)

NOTE 2: Setting a paging priority (or paging policy indicator) in the paging message is independent of any paging strategy.

In order to reduce the signaling load and network resources used to successfully page the UE, the AMF and (R)AN may support additional paging optimization using at least one or more of the following means:
- By the AMF implementing specific paging strategies (e.g., the AMF may send an N2 paging message to the (R)AN node that has recently served the UE);
- By that AMF taking into account information (information on recommended cells and NG-RAN nodes) on recommended cells and NG-RAN nodes provided by (R)AN when switching to the CM-IDLE state. The AMF may determine the (R)AN node to be paged by considering the (R)AN node-related part of the information, include the information on the recommended cells in the N2 paging message, and provide the information to each of the (R)AN nodes;
- By the (R)AN taking into account paging attempt count information provided by the AMF in paging.

When the UE radio capability for paging information is available in the AMF, the AMF may include the UE radio capability for paging information in the N2 paging message and transmit the corresponding N2 paging message to the (R)AN node.

When information on recommended cells and NG-RAN nodes are available in the AMF, the AMF may determine the (R)AN node for paging in consideration of the information, and when paging the (R)AN node, the AMF may transparently transmit the information on the recommended cell to the (R)AN node.

The AMF may include paging attempt count information in the N2 paging message. The paging attempt count information may be the same for all (R)ANs selected for paging by the AMF.

4c) [Conditional operation] When the UE is simultaneously registered for 3GPP access and non-3GPP access in the same PLMN, the UE is in the CM-CONNECTED state in 3GPP access, and the PDU session ID of step 3a is associated with the non-3GPP access, the AMF may transmit a NAS notification message including a non-3GPP access type to the UE through 3GPP access and may set a notification timer. When step 4c is performed, step 5 may be omitted.

When the UE is simultaneously registered for 3GPP access and non-3GPP access in the same PLMN, the UE is in the CM-IDL state in 3GPP access and in the CM-CONNECTED state in non-3GPP access, the PDU session ID of step 3a is associated with 3GPP access, and the AMF determines to notify the UE through the non-3GPP access based on the local policy, the AMF may transmit a NAS notification message including the 3GPP access type to the UE through the non-3GPP access and set a notification timer.

5) [Conditional operation] Signaling from AMF to SMF: The AMF may transmit a notification related to failure of Namf_Communication_N1N2Transfer to the SMF. For example, the AMF may transmit a Namf_Communication_N1N2TransferFailure notification to the SMF.

The AMF oversees the paging procedure using a timer. If the AMF fails to receive a response with respect to the paging request message from the UE, the AMF may apply additional paging according to any available paging strategy described in step 4b.

If the UE does not respond to the paging, the AMF sends a Namf_Communications_N1N2MessageTransfer Failure notification to a notification target address provided by the SMF in step 3a to the SMF to notify the SMF unless the AMF recognizes an ongoing MM procedure that prevents the UE from responding to the SMF. Here, the AMF recognizes the ongoing MM procedure that prevents the UE from responding may be a case in which, for example, the AMF receives an N14 context request message indicating that the UE performs a registration procedure with another AMF.

When the Namf_Communication_N1N2TransferFailure notification is received, the SMF may notify the UPF.

6) When the UE is in the CM-IDLE state in 3GPP access and a paging request for a PDU session related to 3GPP access is received, the UE may initiate the UE initiated service request procedure described in FIGS. 8A to 8C. In step 4 of FIG. 8A, the AMF may call a Nsmf_PDUSession_UpdateSMContext request associated with a PDU session identified in the service request message (excluding the PDU session for the PDU session ID included in Namf_Communication_N1N2MessageTransfer in step 3a of FIG. 7) to the SMF. To support the transfer of buffered data, the SMF may instruct the UPF to establish a data transfer tunnel between the old UPF and the new UPF or PSA as described in steps 6a, 7a, and 8b of FIG. 8A.

When the UE is in the CM-IDLE state in both non-3GPP access and 3GPP access and receives a paging request for a PDU session associated with non-3GPP access, the UE may initiate the UE initiated service request procedure described in FIGS. 8A to 8C. Here, the UE initiated service request procedure may include a list of allowed PDU sessions that may be re-activated through 3GPP access according to the UE policy and whether an S-NSSAI of the PDU session is included in the allowed NSSAI for 3GPP access. If there is no PDU session that may be re-activated through 3GPP access, the UE may include a list of empty allowed PDU sessions. When the AMF receives a service request message from the UE through the non-3GPP access (e.g., due to the UE successfully connecting to the non-3GPP access), the AMF may stop the paging procedure and process the received service request procedure. When the AMF receives the service request message and the list of allowed PDU sessions provided by the UE does not include the PDU session for the UE that has been paged, the AMF may invoke the Namf_EventExposure_Notify service to notify the SMF that the UE is reachable but did not accept re-activation of the PDU session.

When the UE is in the CM-IDLE state in non-3GPP access and in the CM-CONNECTED state in 3GPP access, upon receiving the NAS notification message including the non-3GPP access type through 3GPP access, the UE may initiate UE initiated service request procedure described in FIGS. 8A to 8C. Here, the UE initiated service request procedure may include a list of allowed PDU sessions that may be re-activated through 3GPP access according to the UE policy and whether the S-NSSAI of this PDU session is included in the allowed NSSAI for 3GPP access. If there is no PDU session that may be re-activated through 3GPP access, the UE may include a list of empty allowed PDU sessions. When the AMF receives the service request message and the list of the allowed PDU sessions provided by the UE does not include a PDU session for the UE that has been notified, the AMF may call the Namf_EventExposure_Notify service to notify the SMF that the UE is reachable but did not accept re-activation of the PDU session. When the AMF receives the service request message from the UE through non-3GPP access, the AMF may stop the notification timer and process the received service request procedure.

When the UE is in the CM-IDLE state in 3GPP access and in the CM-CONNECTED state in non-3GPP access, upon receiving the NAS notification identifying the 3GPP access type through the non-3GPP access, the UE may initiate the UE initiated service request procedure described in FIGS. 8A to 8C through 3GPP access if the 3GPP access is available. If the AMF does not receive the service request message before the notification timer expires, the AMF may page the UE through 3GPP access or notify the SMF that the UE was unable to re-activate the PDU session.

7) The UPF may transmit buffered downlink data to the UE through the (R)AN node that has performed the service request procedure.

The network may transmit downlink signaling when a network initiated service request procedure is initiated according to a request from another network described in step 3a.

<Paging Procedure in Internet Protocol Multimedia Subsystem (IMS)>

In a communication system, the provision of an IP-based call service is expanding. For example, the IP-based call service may include a voice call, a video call, and a Short Message Service (SMS), etc. IMS was introduced to support IP-based call service. Hereinafter, a paging procedure in IMS will be described based on an exemplary IMS-based incoming call processing procedure of FIG. 8.

Figure 8:
FIG. 8 is a signal flow diagram illustrating an exemplary IMS-based incoming call processing procedure.

FIG. 8 is a signal flow diagram illustrating an exemplary IMS-based incoming call processing procedure.

In FIG. 8, the originating network may refer to a network of a terminal (eg, UE) that has sent a call. The terminating home network may refer to a network of a terminal (eg, UE) that receives a call originating from the originating network.

FIG. 8 shows an example of a mobile termination procedure.

The procedure shown in FIG. 8 may be applied to users located in a home service area.

The UE may be located in the home network. The UE may determine a Proxy CSCF (P-CSCF) to communicate with itself through a Call Session Control Function (CSCF) discovery procedure.

When the registration procedure is completed (when the UE performs the registration procedure for the P-CSCF), the Serving CSCF (S-CSCF) may know information about the name and address of the P-CSCF. The P-CSCF may know information about the name and address of the UE. Here, the registration procedure may refer to a procedure in which the UE registers with the IMS network including the P-CSCF and S-CSCF.

1) UE #1 (the UE that sent the call in the originating network) may transmit a Session Initiation Protocol (SIP) INVITE request to the S-CSCF. Here, the SIP INVITE request may include an initial Session Description Protocol (initial SDP). The SIP INVITE request message may be transmitted to the S-CSCF through one of origination procedures and one of Serving to Serving CSCF procedures. Here, the S-SCSF of FIG. 8 may be a serving-CSCF for a terminating user.

2) S-CSCF may perform service control operation. Specifically, the S-CSCF may validate the service profile and may invoke termination service logic required for this user (terminating user). The S-CSCF may perform authentication of the requested SDP based on the user's subscription information for multi-media services.

3) The S-CSCF may remember the next hop CSCF for this UE (from the previously performed registration procedure). The S-CSCF may forward the SIP INVITE request to the P-CSCF of the home network.

4) The P-CSCF may determine that the termination is for a Multimedia Priority Service (MPS) session. In this case, the P-CSCF may call a dynamic policy to derive the session information and transmit the derived session information to the Policy and Charging Rules Function (PCRF). The P-CSCF may memorize information about the address of the UE (from the previously performed registration procedure) and forward the SIP INVITE request to the UE.

5) The UE may determine a subset of the media flow proposed by the originating endpoint, and respond to the originator with an Offer Response message. Here, the subset of media flows may include media flows supported by the UE. The SDP may represent one or more media for a multi-media session. The UE may transmit an offer response message to the P-CSCF.

6) P-CSCF may authenticate Quality of Service (QoS) resources. For example, the P-CSCF may instruct the PCRF/PCF to authenticate the resources required for this session.

NOTE: P-CSCF can additionally authorize the resources in step 4). For example, when request indicates no requirements for resource reservation or that the required resources are already available on the originating side, as in such cases no SDP answer is received before the PCRF is requested to authorize the required QoS resources, additional authentication may be performed.

7) The P-CSCF may deliver an offer response message to the S-CSCF.

8) The S-CSCF may deliver the offer response message to the originator. For example, the S-CSCF may deliver the offer response message to the originator according to the S-S procedure (eg, the procedure between the S-CSCF of the originating network and the S-CSCF of FIG. 8).

9) The originating endpoint may transmit a Response Confirmation message to the S-CSCF. For example, the originating endpoint may transmit a response confirmation message through the S-S procedure. The response confirmation message may include an SDP. The SDP included in the response confirmation message may be the same SDP as the SDP included in the offer response message transmitted in step 8) or a subset of the SDP included in the offer response message. When new media is defined by the SDP in the response confirmation message, new authentication may be performed according to step 12 (in the same manner as the authentication performed in step 6). The originating UE may provide new media in the operation of step 9 or may provide new media in a subsequent exchange using the update method. For each offer/response exchange, the P-CSCF may repeat the operation of step 6).

10) The S-CSCF may deliver a response acknowledgment message to the P-CSCF.

11) The P-CSCF may deliver a response acknowledgment message to the UE.

12) The UE may respond to the acknowledgment message by sending an acknowledgment (Ack) to the P-CSCF. The response confirmation message may optionally include an SDP. When the optional SDP is included in the response acknowledgment message, the acknowledgment Ack may also include the SDP response. If the SDP is changed, the P-CSCF may authenticate the available resources.

13) The UE may perform resource reservation. For example, depending on the bearer establishment mode selected for the Internet Protocol Connectivity Access Network (IP-CAN) session, the resource reservation may be initiated by the UE or by the IP-CAN itself. The UE may initiate a reservation procedure for the necessary resources for this session. In other cases, after step 6 is performed, IP-CAN may initiate a reservation for a necessary resource.

14-15) The P-CSCF may deliver the Confirmation Ack to the originating endpoint through the S-CSCF.

16-18) When the originating endpoint completes resource reservation, the originating endpoint may transmit a successful resource reservation message (eg, reservation Confirmation message) to the S-CSCF. The originating endpoint may transmit a reservation confirmation message to the S-CSCF through the S-S procedure. The S-CSCF may deliver this message to the destination endpoint (UE) through a signaling path (eg, a path including a network node such as P-CSCF, RAN, etc.).

19) The UE may alert the called user of the incoming session establishment attempt.

20-22) The UE sends a response message for successful resource reservation, and this response message may be delivered to the originating endpoint.

23-25) Before completing the session, the UE may warn the user and wait for an indication from the user. In this case, the UE may indicate this to the originating party by transmitting a provisional response message indicating the ringing. This message is sent to the P-CSCF and may be delivered to the originating endpoint through a signaling path.

26) When the destination party (eg, the user of the UE) responds (answer), the UE may transmit a SIP 200-OK final response message to the P-CSCF.

27) The P-CSCF may indicate that the approved media flow for this session should now be activated. The P-CSCF may perform a procedure for activating an approved media flow for this session.

28) The UE may initiate media flow(s) for this session.

29-30) The P-CSCF may deliver the 200-OK message to the S-CSCF along the signaling path.

31-33) The session originator may respond to the 200-OK message by sending an ACK message. For example, the session originator may transmit an ACK message to the S-CSCF through the S-S procedure. The S-CSCF may forward the ACK message to the destination endpoint along the signaling path.

Figure 9:
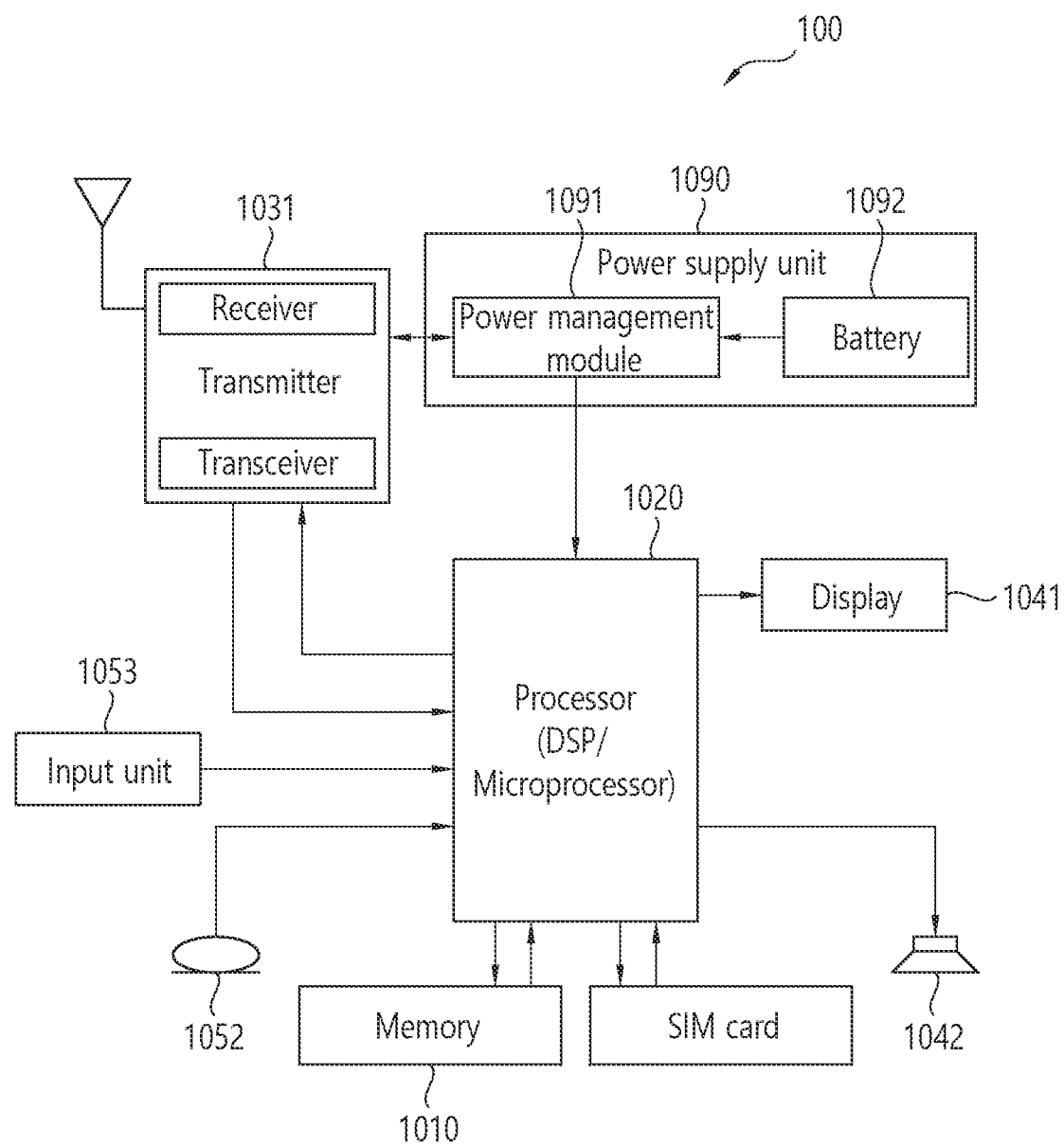
FIG. 9 is a block diagram showing a structure of a terminal according to an embodiment.

FIG. 9 is a block diagram showing a structure of a terminal according to an embodiment.

A terminal includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed functions, procedures, and/or methods described in the present specification. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various well-known means.

The transceiver 1031 is operatively coupled to the processor 1020, and transmits and/or receives a radio signal. The transceiver 1031 includes a transmitter and a receiver. The transceiver 1031 may include a baseband signal for processing a radio frequency signal. The transceiver controls one or more antennas to transmit and/or receive a radio signal. In order to initiate communication, the processor 1020 transfers command information to the transceiver 1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like. The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

Figure 14:
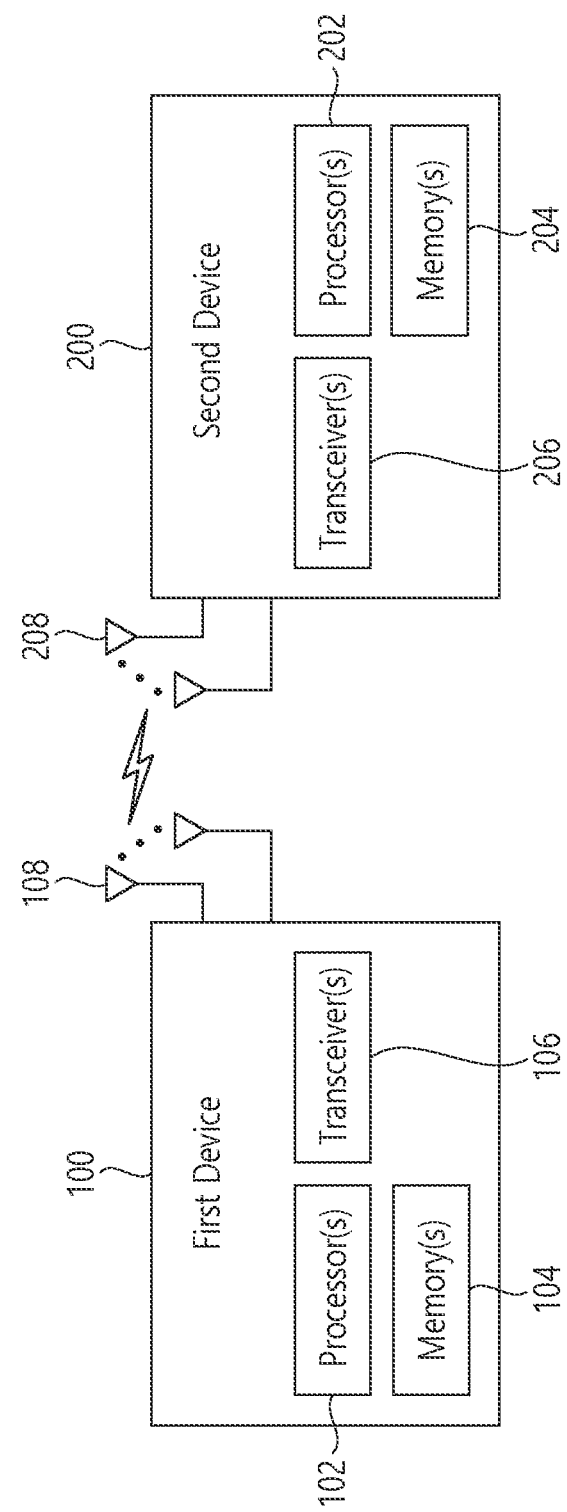
FIG. 14 illustrates an example of a wireless device that can be applied to the present specification.

For reference, the terminal 100 of FIG. 9 may be either the first wireless device 100 or the second wireless device 200 of FIG. 14. The transceiver 1031 of FIG. 9 may be the transceiver 106 or 206 of FIG. 14. The processor 1020 of FIG. 9 may be the processor 102 or 202 of FIG. 14. The memory 1010 of FIG. 9 may be the memory 104 or 204 of FIG. 14.

<Multi SIM>

In the example of FIG. 9, the terminal includes one SIM card, but the terminal may include a plurality of SIM cards. For example, the terminal may perform communication in a communication network of a plurality of mobile communication operators using a plurality of SIM cards. A terminal supporting Multi SIM means a terminal supporting a plurality of SIM cards.

A lot of terminals supporting Multi SIM are being distributed mainly in developing countries. In these countries, there are many mobile operators that provide voice and data. In addition, service fields in which each mobile communication service provider has an advantage may be different. A user may receive a communication service from a plurality of operators through a terminal supporting Multi SIM.

For example, the user may use the terminal by mounting a SIM card of a different communication service provider for each service in the terminal. For example, the user may mount a SIM card for a first operator for a voice communication service and a SIM card for a second operator for a data communication service in the terminal. Then, the user may use the voice communication service through the first operator and the data communication service through the second operator.

As another example, when regions in which a plurality of operators provide services are different from each other, the user may mount a plurality of SIM cards in the terminal. Then, the user can flexibly receive services from a plurality of operators in various regions. For example, a first operator may provide a communication service in area A, and a second operator may provide a communication service in area B. When both the SIM cards for the first operator and the SIM card for the second operator are installed in the terminal, the user uses the communication service through the communication network of the first operator in area A, and the user uses the communication service through the communication network of the second operator in area B.

LTE systems and NR systems support numerous frequency bands. Accordingly, most terminals may have functional limitations. For example, most terminals may have functional limitations in using communication networks of various operators. Specifically, most terminals may include one modem and one application processor (AP). In addition, most terminals may support only the frequency band used in the region where each terminal is released (eg, Korea, North America, Japan, China, etc.). Otherwise (for example, if the terminal includes a plurality of modems or a plurality of APs, or if the terminal is implemented to support various frequency bands), the size of the terminal may increase, the battery consumption of the terminal may increase, and the price of the terminal may increase.

Due to these functional limitations, a terminal supporting Multi SIM may operate in a dual SIM dual standby method. That is, when a plurality of SIM cards are mounted in the terminal, the terminal may share one modem when performing communication using each of the plurality of SIM cards. For example, by transitioning to a system corresponding to each SIM card (a first system corresponding to a first SIM card, a second system corresponding to a second SIM card, etc.) while sharing one modem, the terminal may support multiple SIM cards simultaneously.

The terminal may monitor paging of a plurality of systems corresponding to the plurality of SIM cards (communication systems provided by operators of each SIM card). For example, the terminal may transition to a plurality of systems and periodically monitor paging for each of the plurality of SIM cards.

As a specific example, the terminal may monitor the paging of the first SIM card in the first system corresponding to the first SIM card at intervals of 1 second to 10 seconds. The terminal may monitor the paging of the second SIM card in the second system corresponding to the second SIM card at intervals of 5 to 10 seconds. In this case, the terminal, by adjusting the RF chain, may checks the paging in System 1 starting from 1 s with 10 seconds of period, such as 1 second, 11 seconds, 21 seconds, etc, and 31 seconds, and may checks the paging in System 2 starting from 5 seconds with 10 seconds of period, such as 5 seconds, 15 seconds, 25 seconds, 35 seconds, etc. In this way, the terminal can monitor paging from a plurality of systems/operators using one modem.

II. Problems to be Solved by the Disclosure of the Present Specification

There may be a case in which a first SIM card and a second SIM card are mounted in a terminal supporting Multi SIM. In this case, the terminal may perform data communication in a system (eg, the first system of the first operator) connected to the first SIM card. While the terminal performs data communication in the first system, data may be transmitted from a system (eg, a second system of a second operator) connected to the second SIM card to the terminal. That is, there may be a case in which data is received from the second system while the terminal performs data communication in the first system. In order for the terminal to receive data from the second system, the terminal needs to receive a paging message from the second system. However, the terminal does not know which data or which service is associated with the paging message received from the second system.

In this case, the terminal may perform a paging response operation in the frequency band of the second system by adjusting the RF chain as described above in order to receive the paging from the second system connected to the second SIM card. While the terminal receives the paging from the second system and responds to the paging, the terminal may be in a state in which data communication with the first system cannot be performed.

If the data to be transmitted to the terminal in the second system has a lower priority than the data transmitted and received by the terminal in the first system, since the terminal cannot communicate in the first system due to paging in the second system, service satisfaction for the user of the terminal may decrease. A specific example will be described assuming that the priority of voice call is higher than that of SMS. If the terminal performs a paging response operation to receive SMS in the second system while the terminal is using the voice call in the first system, the user cannot use the high-priority voice call.

III. Disclosure of the Present Specification

The disclosures described below in this specification may be implemented in one or more combinations. Each of the drawings shows an embodiment of each disclosure, but the embodiments of the drawings may be implemented in combination with each other.

Several methods of the disclosure of the present specification to be described below (eg, methods described in the first to fourth examples) may be implemented in combination of one or more.

In order to solve the above-described problem, there is a need for a method of informing the terminal of which data or which service has caused paging in the second system. For example, it may be necessary to include information indicating that paging has occurred due to a certain data or a certain service received paging message in the second system. To this end, when data to be transmitted to the terminal arrives in the network of the second system, there is a need for a method in which the network node of the second system can identify which data or what service the data is from.

Hereinafter, when data is received from the second system corresponding to the second SIM card while the terminal is performing data communication in the first system corresponding to the first SIM card, a method of transmitting information on the data (eg, information about what kind of data it is or what service the data is transmitted for) to the terminal in the second system will be described.

For example, the terminal may be equipped with a first USIM and a second USIM. The terminal may be registered in the first system using the first USIM and registered in the second system using the second USIM. While the terminal is transmitting and/or transmitting data from the first system, when data related to a service (eg, phone call, SMS, etc.) arrives from the second system, the second system may transmit a paging message to the terminal. In this case, the second system may transmit the paging message to the terminal by including information that a call has arrived in the paging message. To this end, a method for effectively determining which service (eg, phone call, SMS, etc.) the data is related to by the second system will be described.

There may be a case in which terminals providing a service to a user based on a plurality of systems (eg, a first system of a first USIM, a second system of a second USIM) cannot simultaneously be provided with a service associated with each system. In this case, according to the content to be described below, each different system can effectively determine (or identify) the data arriving at the terminal, so that the paging message can be effectively transmitted to the terminal. In addition, the terminal effectively receives the paging message, thereby improving the user's service satisfaction.

The operation of the terminal and the operation of the network node (eg, AMF node, SMF node, PCF node, UPF node, P-CSCF node, etc.) described below may be applied to the following cases. For example, when a terminal equipped with a plurality of SIM cards needs to register with a plurality of systems, when the terminal needs to efficiently process paging, and/or when a system including a network node supports the terminal to efficiently processes paging, the operation of the terminal and the operation of the network described below may be applied.

Figure 10:
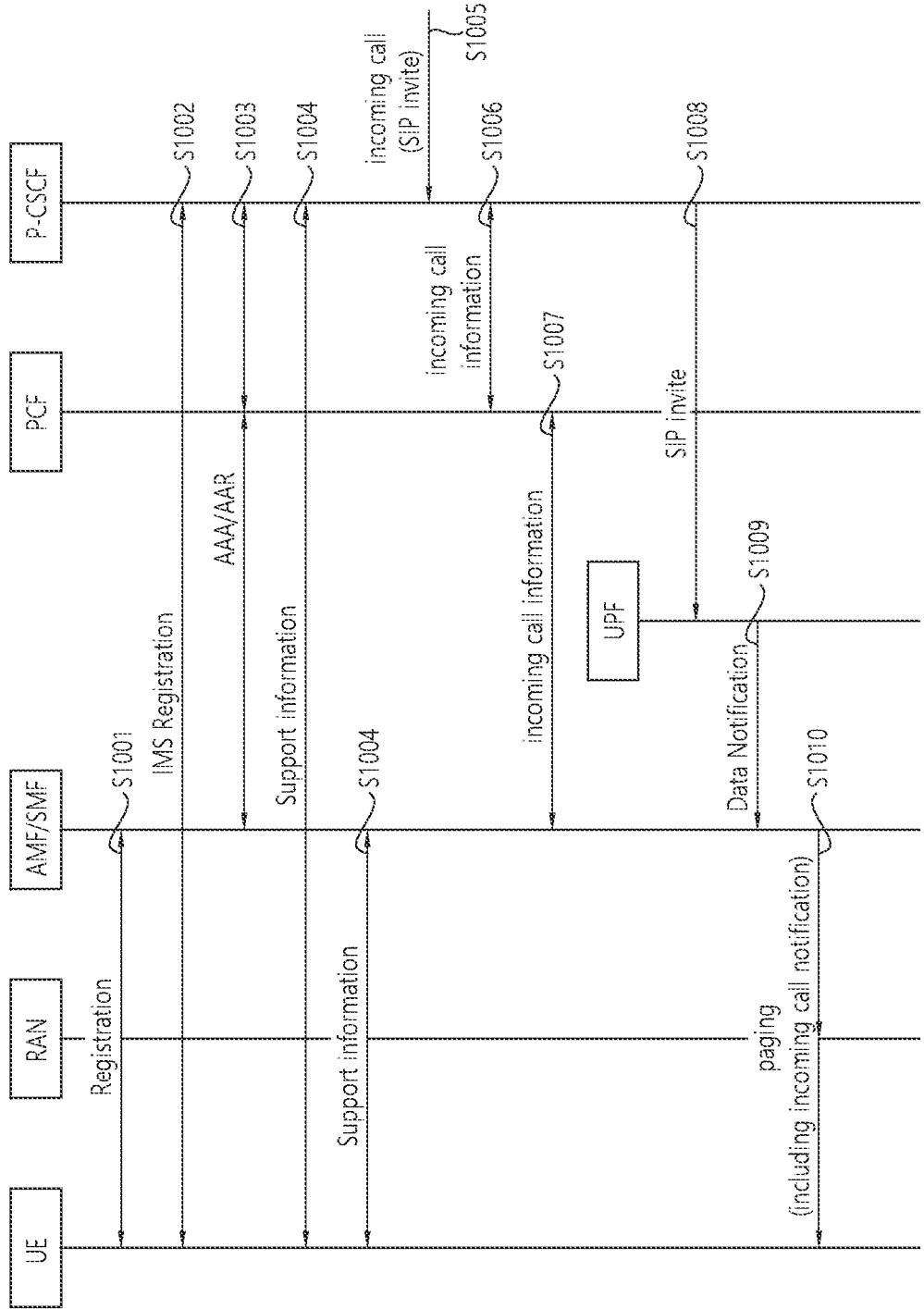
FIG. 10 shows a signal flow diagram according to a first example of the disclosure of the present specification.
Figure 11:
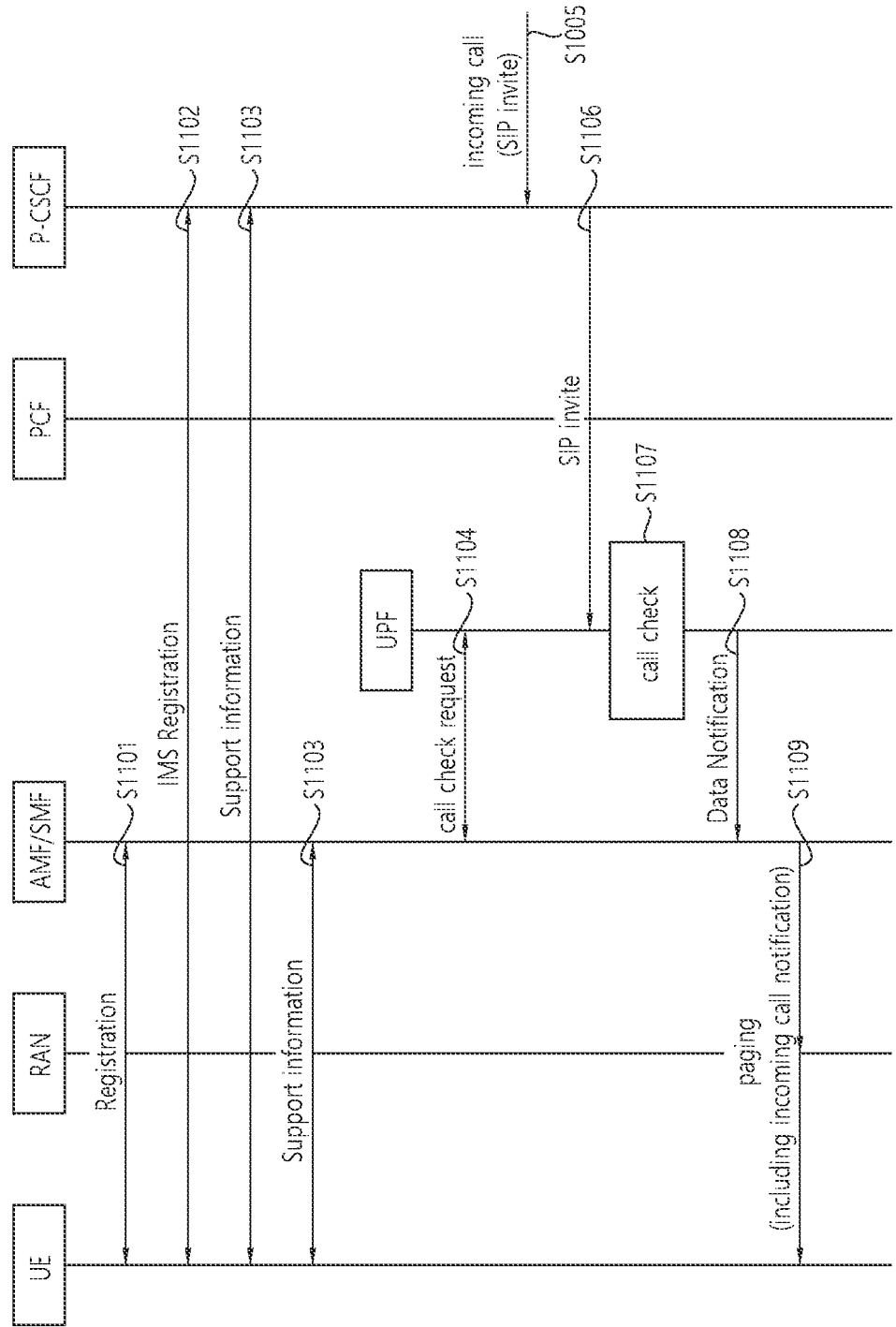
FIG. 11 shows a signal flow diagram according to a second example of the disclosure of the present specification.
Figure 12:
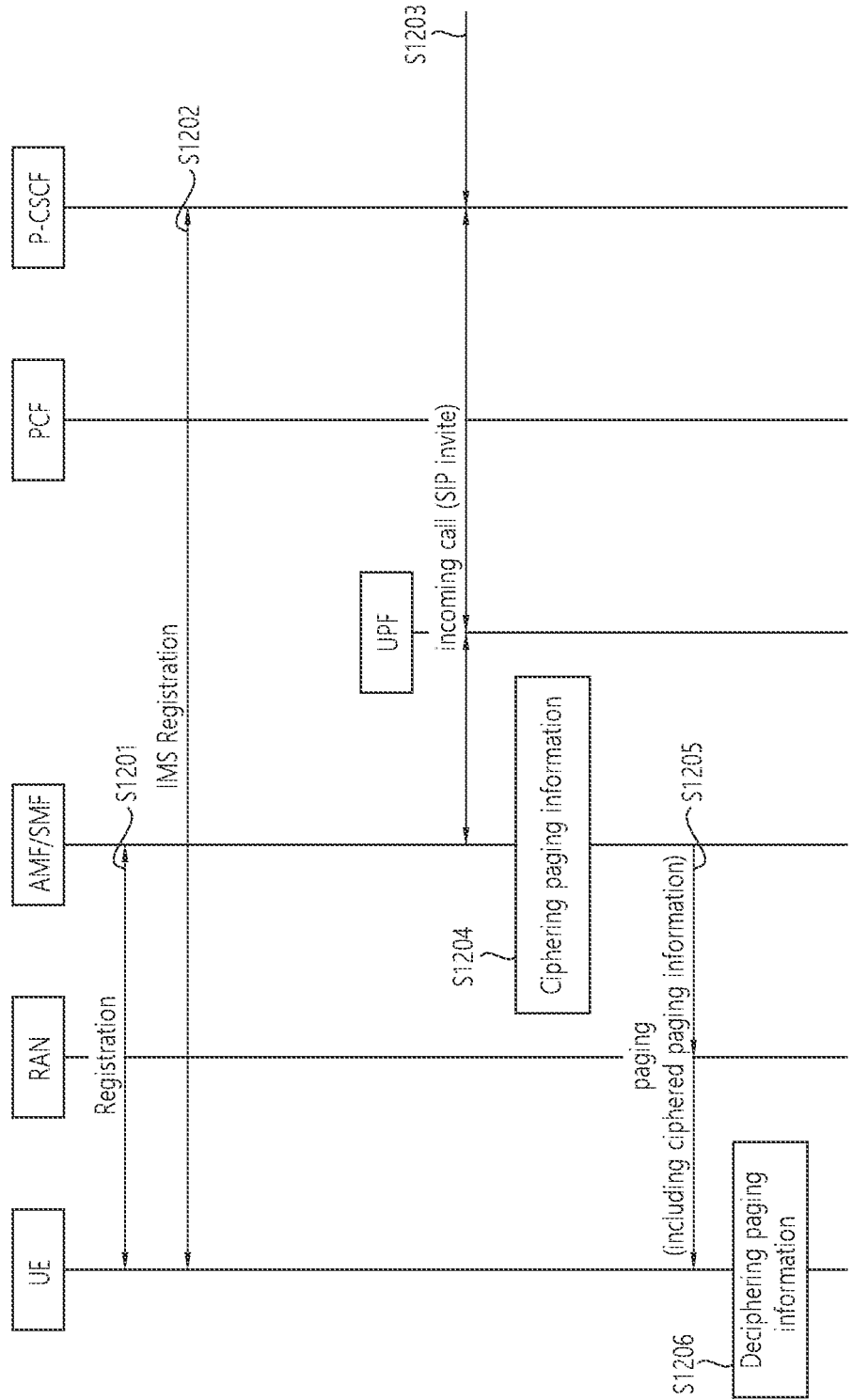
FIG. 12 shows a signal flow diagram according to a fourth example of the disclosure of the present specification.

The network node and/or the IMS node of FIGS. 10 to 12 is a network node and/or an IMS node included in the second system of the second SIM, not the first system of the first SIM through which a terminal using a plurality of SIMs performs data communication. In other words, in a situation in which the terminal is equipped with the first SIM and the second SIM, and the terminal is performing data communication in the first system related to the first SIM, the network node and/or IMS node included in the second system of the second SIM is shown in the examples of FIGS. 10-12.

For reference, in the following, the disclosure of the present specification is described based on terms related to the network nodes of the 5G system and the 5G system, but this is only an example, and the contents described in the disclosure of the present specification may be applied to the network nodes and terminal of the 4G system.

1. First Example of the Disclosure of the Present Specification

A first example of the disclosure of the present specification will be described with reference to FIG. 10.

The following drawings were created to explain an example of the problem to be solved by the disclosure of the present specification. Since the names of specific devices described in the drawings or the names of specific signals/messages/fields are presented by way of example, the technical features of the present specification are not limited to the specific names used in the following drawings.

FIG. 10 shows a signal flow diagram according to a first example of the disclosure of the present specification.

Referring to FIG. 10, UE, RAN, AMF/SMF, PCF, and P-CSCF are shown. A UE is an example of a wireless communication device. The RAN may include a base station (eg, gNB, eNB, etc.). AMF/SMF means an AMF node and an SMF node. Although the AMF node and the SMF node are illustrated as one object in FIG. 10, this is only an example, and the AMF node and the SMF node may be implemented as separate objects. Alternatively, the AMF node and the SMF node may be included in one device. PCF may mean a PCF node. The P-CSCF may mean a P-CSCF node and may be included in the IMS network.

The operations performed by the AMF/SMF in FIG. 10 may be operations performed by the AMF node or the SMF node, respectively. The operation performed by the AMF/SMF may be an operation performed after the AMF node and the SMF node communicate with each other. For example, the operation of the AMF/SMF may be an operation performed by the SMF node after the AMF node receives a message from the RAN, the PCF node, and the like and delivers the message to the SMF node. Conversely, the operation of the AMF/SMF may be an operation performed by the AMF node after the SMF node receives a message from the PCF node or the UPF node and the like and delivers the message to the AMF node.

In step S1001, the terminal (eg, UE) may perform a procedure for registering with the system. The terminal may be a terminal supporting Multi SIM. A plurality of SIM cards are mounted in the terminal, and the terminal may perform a registration procedure for a system corresponding to each of the plurality of SIM cards.

In the process of performing the registration procedure, the terminal may transmit information indicating that requesting information related to the incoming IMS service to the network. For example, the information requesting information related to the incoming IMS service may include information that a plurality of SIMs are used and/or information that effective paging processing is required. The UE may transmit information that a plurality of SIMs are used and/or information that effective paging processing is required to the AMF node via the RAN. The AMF node may transmit information requesting information related to the incoming IMS service (eg, information that a plurality of SIMs are used and/or information that effective paging processing is required) to the SMF node, the PCF node, and the like. While the UE performs the registration procedure, the network (eg, AMF node and/or SMF node) may transmit information about the IMS network, such as P-CSCF, to the UE. The UE may perform the IMS registration procedure in a later step based on information on the IMS network such as P-CSCF.

In step S1002, the terminal may perform an IMS registration procedure. For example, the terminal may perform an IMS registration procedure to perform an IMS service (eg, a voice call service, a vide call service, an SMS service, etc.). While the terminal performs the IMS registration procedure, the terminal may inform information that the terminal uses multiple SIMs and/or information that effective paging processing (eg, including information on the presence of an incoming call in the paging message) is required to the P-CSCF.

In step S1003, in order to effectively process the IMS service-related procedure of the terminal, the PCF node and the P-CSCF node may create an association with each other during the IMS registration process or after the IMS registration process is completed. For example, the PCF node and the P-CSCF node may create an association using an AA-Request (AAR) message and/or an AA-Answer (AAA) message.

Through association, a network node (eg, AMF node, SMF node, PCF node, etc.) and an IMS node (eg, P-CSCF, etc.) may check whether an effective paging procedure for the terminal equipped with multiple SIM is supported or whether a communication with the terminal equipped with multiple SIM is supported. For example, a network node (eg, an AMF node, an SMF node, a PCF node, etc.) transmits information on whether or not it supports communication with a terminal equipped with a plurality of SIMs and/or information on whether or not it supports not an effective paging procedure for a terminal equipped with a plurality of SIMs. Conversely, the IMS node may transmit information about whether it supports communication with a terminal equipped with a plurality of SIMs and/or whether it supports an effective paging procedure for a terminal equipped with a plurality of SIMs to the network node (eg: AMF node, SMF node, PCF node, etc.).

Network (Eg AMF Node, SMF Node, PCF Node, Etc.) and IMS Node (Eg P-CSCF Node)

In addition, the network node (eg, AMF node, SMF node, PCF node, etc.) may request the IMS node to notify the network node, when an incoming IMS service (eg, an incoming call) for a terminal (eg, UE) comes or other signaling is required for the terminal. Additionally, when an incoming IMS service (eg, an incoming call) to the terminal comes, or when other signaling to the terminal is required, the IMS node transmits information that the IMS node can notify that an incoming IMS service (eg, an incoming call) to the terminal comes or when other signaling to the terminal is required, to the network node (eg, AMF node, SMF node, PCF node, etc.).

In step S1004, the network node (eg, AMF node, SMF node, PCF node, etc.) and/or IMS node (eg, P-CSCF, etc.) may transmit information on whether or not the network node and/or the IMS node supports communication with a terminal equipped with a plurality of SIMs and/or information on whether an effective paging procedure for a terminal equipped with a plurality of SIMs is supported to the terminal. Support information may refer to the information on whether the network node and/or the IMS node supports communication with a terminal equipped with a plurality of SIMs and/or information on whether or not support an effective paging procedure for a terminal equipped with a plurality of SIMs is supported.

The information on whether an effective paging procedure is supported may mean, for example, whether the network node and/or the IMS node can inform the terminal of which data or which service (eg, an incoming call) the paging message to be transmitted is related to.

In step S1005, when data (eg, IMS service related data) for the terminal (eg, UE) is generated, the P-CSCF node may receive a SIP invite message. For example, when an incoming call to the terminal is received, the P-CSCF node may receive a SIP invite message.

The SIP invite message may include an IMS Communication Service Identifier (ICSI). The SIP invite message may also include caller information of the incoming IMS service. Based on the information included in the SIP invite message such as ICSI, the P-CSCF node may determine service information (eg, information on the type of service), such as whether the incoming call is a voice call, a video call, an SMS, or another service. The P-CSCF may additionally transmit service information to the AMF/SMF in step S1006 so that the service information can be utilized for paging.

In step S1006, the P-CSCF recognizing that there is an incoming call to the terminal according to step S1005 may transmit information related to the incoming IMS service to the PCF. For example, the information related to the incoming IMS service may include information (eg, information that a call is coming) that an incoming call exists to the PCF.

The information related to the incoming IMS service may also include caller information of the incoming IMS service. The P-CSCF may additionally transmit service information (eg, service type information).

In step S1007, the PCF may transmit information that an incoming call exists (eg, information that a call is coming) to the AMF node and/or the SMF node. The PCF may additionally transmit service information (eg, service type information).

In step S1008, the P-CSCF may transmit a SIP invite message to the UPF node.

In step S1009, when the UPF node receives a packet (eg, a SIP invite message), the UPF node may notify the SMF node that data has arrived. For example, the UPF node may transmit a data notification message to the AMF node and/or the SMF node. After the SMF node receives the data notification message, the SMF node may forward the data notification message to the AMF node.

In step S1010, the AMF node and/or the SMF node may transmit a paging message to a terminal (eg, UE) via the RAN. The paging message may include information of paging due to an incoming call. Specifically, the SMF node may recognize that the data related to the data notification message in step S1009 is for the incoming call, based on the information that the incoming call exists in step S1007. That is, when the P-CSCF transmits information that an incoming call exists to the SMF node, the SMF node can recognize which service (incoming call) the data notification message notifies of data upon receiving the data notification message. The SMF node may transmit information about which service (incoming call) the data notification message notifies the data related to, to the AMF node. The AMF node may transmit a paging message to the UE via the RAN. The AMF node may include information that the paging is related to the incoming call in addition to the paging message. The RAN may transmit a paging message including information that the corresponding paging is related to an incoming call to the terminal. In step S1007, when service information (eg, information on service type) is also received, the AMF node may also include service information (eg, information on service type) in the paging message.

In the example of FIG. 10, the P-CSCF node may perform steps S1006 and S1008 using a timer or a time difference to prevent step S1009 from being performed before step S1007. Here, step S1009 is a step performed due to the SIP invite message transmitted in step S1008. When the P-CSCF node performs steps S1006 and S1008 using a timer or time difference, when the AMF/SMF (AMF node and/or SMF node) transmits a paging message to the RAN, it is possible to prevent omission of information that the paging is due to a call. For example, the P-CSCF node may operate a timer after performing step S1006. Then, when the timer expires, the P-CSCF node may perform step S1008. As another example, the P-CSCF node may perform step S1008 after a predetermined time (eg, 1 second, 1.5 seconds, etc.) has elapsed after performing step S1006.

Alternatively, after the AMF/SMF (AMF node and/or SMF node) receives the data notification message in step S1009, the AMF/SMF may wait whether step S1007 is performed for a predetermined time (eg, 1 second, 1.5 seconds) using a preset time or a pre-negotiated time. For example, after receiving the data notification message, the AMF/SMF (AMF node and/or SMF node) checks whether information indicating that an incoming call exists (incoming call information in step S1007) is received from the PCF after waiting for a predetermined time (eg, 1 second, 1.5 seconds, etc.), the AMF/SMF (AMF node and/or SMF node) may transmit the paging message to the RAN/terminal. When information indicating that an incoming call exists is received within a predetermined time, the paging message may include information indicating that the paging is due to an incoming call. When information indicating that an incoming call exists is received within a predetermined time, the paging message may not include information indicating that paging is due to the incoming call.

For reference, in step S1006 and step S1007 of the example of FIG. 10, the P-CSCF performs an operation of transmitting information that an incoming call exists to AMF/SMF/UPF/PCF, but this is only an example and, steps S1006 and S1007 may be omitted. For example, when the data notification message is transmitted to the AMF/SMF in step S1009, the AMF/SMF/UPF/PCF may inquire of the P-CSCF whether an incoming call exists. Here, AMF/SMF/UPF/PCF may mean one or more of an AMF node, an SMF node, a UPF node, and/or a PCF node. When the AMF/SMF/UPF/PCF receives information on whether an incoming call exists from the P-CSCF, a paging message may be transmitted in step S1010 based on the received information. Based on the information about whether an incoming call exists or not, received from the P-CSCF, the paging message may include information on whether an incoming call has occurred (information that paging is due to an incoming call an incoming call or information that paging is not due to an incoming call).

When the P-CSCF node transmits the SIP invite message in step S1008, the P-CSCF node may include a specific value (eg, a specific value indicating that an incoming call exists) in the IP header of the SIP invite message. For example, the P-CSCF may mark a specific code point of the DSCP in the SIP invite message to inform the UPF that an incoming call exists.

The terminal (eg, UE) may perform other operations, such as responding to paging or not responding to paging, based on the paging message received in step S1010. When the terminal responds to the paging, the terminal may transmit a response message (eg, a SIP OK message) to the UPF node. The UPF node can send a response message (eg SIP OK message) to the P-CSCF node. When the terminal does not respond to paging, the terminal may transmit a response message (eg, a message indicating that it does not respond to paging) to the SMF node and/or the AMF node. Then, the SMF node and/or the AMF node may transmit the response message to the P-CSCF node via the PCF node. An operation performed by the UE (eg, UE) based on the paging message will be described in detail in the third example of the disclosure of the present specification.

2. Second Example of the Disclosure of the Present Specification

In the first example of the disclosure of the present specification, a method in which the P-CSCF node proactively informs other network nodes and terminals of the existence of an incoming call has been described. In the second example of the disclosure of the present specification, a method of notifying the UE of the presence of an incoming call by minimizing the change in the operation of the IMS node (eg, P-CSCF node) will be described. For example, a method of minimizing the change in the operation of an IMS node (eg, a P-CSCF node) will be described in order to determine that data generated in the network is generated due to an activity related to IMS.

Specifically, upon the UPF node receives data from the P-CSCF node, the UPF node may determine the type of received data according to a predefined rule. The UPF node may include information related to the characteristics of the type of data in the data notification message and transmit it to the SMF node. The SMF node may send a notification message to the AMF node. The AMF node and the RAN may transmit a paging message to the terminal by using a data notification message including information related to characteristics of data types.

Hereinafter, operations of the network nodes and the terminal according to the second example of the present specification will be described in detail with reference to FIG. 11.

The following drawings were created to explain an example of the problem to be solved by the disclosure of the present specification. Since the names of specific devices described in the drawings or the names of specific signals/messages/fields are presented by way of example, the technical features of the present specification are not limited to the specific names used in the following drawings.

FIG. 11 shows a signal flow diagram according to a second example of the disclosure of the present specification.

Referring to FIG. 11, UE, RAN, AMF/SMF, PCF, and P-CSCF are shown. A UE is an example of a wireless communication device. The RAN may include a base station (eg, gNB, eNB, etc.). AMF/SMF means an AMF node and an SMF node. Although the AMF node and the SMF node are illustrated as one object in FIG. 11, this is only an example, and the AMF node and the SMF node may be implemented as separate objects. Alternatively, the AMF node and the SMF node may be included in one device. PCF may mean a PCF node. The P-CSCF may mean a P-CSCF node and may be included in the IMS network.

The operations performed by the AMF/SMF in FIG. 11 may be operations performed by the AMF node or the SMF node, respectively. The operation performed by the AMF/SMF may be an operation performed after the AMF node and the SMF node communicate with each other. For example, the operation of the AMF/SMF may be an operation performed by the SMF node after the AMF node receives a message from the RAN, the PCF node, and the like and delivers the message to the SMF node. Conversely, the operation of the AMF/SMF may be an operation performed by the AMF node after the SMF node receives a message from the PCF node or the UPF node and the like and delivers the message to the AMF node.

In step S1101, the terminal (eg, UE) may perform a procedure for registering with the system. The terminal may be a terminal supporting Multi SIM. A plurality of SIM cards are mounted in the terminal, and the terminal may perform a registration procedure for a system corresponding to each of the plurality of SIM cards. In the process of performing the registration procedure, the terminal may transmit information indicating that requesting information related to the incoming IMS service, to the network.

For example, the information requesting information related to the incoming IMS service may include information that a plurality of SIMs are used and/or information that effective paging processing is required. The UE may transmit information indicating that a plurality of SIMs are used and/or information indicating that effective paging processing is required to the AMF node via the RAN. The AMF node may transmit information requesting information related to the incoming IMS service (eg, information that a plurality of SIMs are used and/or information that effective paging processing is required) to the SMF node, the PCF node, and the like. While the UE performs the registration procedure, the network (eg, AMF node and/or SMF node) may transmit information about the IMS network, such as P-CSCF and the like, to the UE. The UE may perform the IMS registration procedure in a later step based on information about the IMS network such as P-CSCF.

In step S1102, the terminal may perform an IMS registration procedure. For example, the terminal may perform an IMS registration procedure to perform an IMS service (eg, a voice call service, a vide call service, an SMS service, etc.). While the UE performs the IMS registration procedure, the UE may inform information that the UE uses multiple SIMs and/or that effective paging processing (eg, including information on the presence of an incoming call in the paging message) is required to the P-CSCF.

In step S1103, if steps S1101 and S1102 are successfully performed, the network node (eg, AMF node, SMF node, PCF node, etc.) and/or IMS node (eg, P-CSCF, etc.) may transmit information on whether or not the network node and/or the IMS node supports communication with a terminal equipped with a plurality of SIMs and/or information on whether an effective paging procedure for a terminal equipped with a plurality of SIMs is supported to the terminal. Support information may refer to the information on whether the network node and/or the IMS node supports communication with a terminal equipped with a plurality of SIMs and/or information on whether or not support an effective paging procedure for a terminal equipped with a plurality of SIMs is supported.

The information on whether an effective paging procedure is supported may mean, for example, whether the network node and/or the IMS node can inform the terminal of which data or which service (eg, an incoming call) the paging message to be transmitted is related to.

In step S1104, the SMF node may transmit a call check request message to the UPF node. The call check request message may instruct the UPF node to notify information about a specific QFI or specific QCI, when a packet related to a specific QCI (QoS (Quality of Service) Class Identifier) or a specific QFI (QoS Flow ID) is received by the UPF node, so that when the UPF node transmits a data notification message to the SMF node. That is, the SMF node may request the UPF to indicate that a packet related to a specific QCI or a specific QFI has been received in the data notification message by sending a call confirmation request message to the UPF node.

For example, QCI corresponding to IMS signaling may be QCI 5. Alternatively, QFI corresponding to IMS signaling may be QFI 5. By sending a call check request message to the UPF node, the SMF node may request to perform the following operation. When the UPF node identifies that the packet received from the P-CSCF is a packet corresponding to QCI 5, the UPF node may notify that data of QCI=5 has been received while transmitting a data notification message. Alternatively, when the UPF node transmits the data notification message, information related to QC/QFI/5QI (5G QoS Identifier) corresponding to the data received by the UPF node may also be transmitted.

In step S1105, when data (eg, IMS service related data) for the terminal (eg, UE) occurs, the P-CSCF node may receive a SIP invite message. For example, when an incoming call to the terminal is received, the P-CSCF node may receive a SIP invite message. That is, the SIP invite message may be a message corresponding to an incoming call.

In step S1106, the P-CSCF node may transmit a SIP invite message to the UPF node. The UPF node may receive the SIP invite message. The SIP invite message may also include caller information of the incoming IMS service.

In step S1107, the UPF node may perform a call confirmation procedure based on the SIP invite message. For example, the UPF node may examine which 5QI, which QCI, and/or which QFI the packet in the SIP invite message corresponds to.

In step S1108, the UPF node may transmit a data notification message to the SMF node and/or the AMF node. The UPF node may transmit QFI information, QCI information, and/or 5QI information together with the data notification message. Alternatively, the UPF node may transmit information that an IMS signaling has arrived (or received) or information that an incoming call exists along with the data notification message. After the SMF node receives the data notification message, it may forward the data notification message to the AMF node.

In step S1109, the SMF node and/or the AMF node may transmit a paging message to a terminal (eg, UE) via the RAN. The paging message may include QFI information, QCI information, and/or 5QI information. Alternatively, the paging message may include information of paging due to an incoming call. For example, when QCI or 5QI is 5, the paging message may include information of IMS signaling or information of an incoming call.

The terminal (eg, UE) may respond to the paging based on the paging message received in step S1109 or may not respond to the paging. For example, based on the paging message, the terminal may check whether the paging message is transmitted due to data for which service, which QCI, and/or which 5QI. The terminal may perform other operations such as responding to a paging message or not responding to a paging message based on the checked service, QCI and/or 5QI. When the terminal responds to the paging, the terminal may transmit a response message (eg, a SIP OK message) to the UPF node. The UPF node may send a response message (eg SIP OK message) to the P-CSCF node. When the terminal does not respond to paging, the terminal may transmit a response message (eg, a message indicating that it does not respond to paging) to the SMF node and/or the AMF node. Then, the SMF node and/or the AMF node may transmit the response message to the P-CSCF node via the PCF node. An operation performed by the UE (eg, UE) based on the paging message will be described in detail in the third example of the disclosure of the present specification.

3. Third Example of the Disclosure of the Present Specification

In a third example of the disclosure of the present specification, operations performed by a terminal (eg, UE) that has received the paging message of step S1010 of FIG. 10 or a terminal (eg, UE) that has received the paging message of step S1109 of FIG. 11 are explained. For reference, the operation of the terminal (eg, UE) described in the third example of the disclosure of this document may be applied together with the first example and/or the second example of the disclosure of the present specification, and it can also be applied independently of the first example and the second example.

The UE (eg, UE) may decide to respond to the paging or not to respond to the paging based on information included in the paging message. The information included in the paging may be, for example, service information such as, information about which service a packet has arrived (received), or whether the incoming call is a voice call, a video call, an SMS or other service, or caller information of an incoming IMS service, and the like It is assumed that the network node and the IMS node shown in FIGS. 10 to 11 are included in the second system related to the second SIM of the terminal. The terminal may determine whether to respond to the paging message based on information about data communication performed by the terminal in the first system related to the first SIM and the paging message received in the second system. For example, the terminal may determine whether to respond to the paging message based on the importance of data communication performed by the terminal in the first system and the importance of data communication related to the paging message received in the second system.

For example, if data communication performed by the terminal in a first system related to the first SIM is more important than data communication associated with a paging message received in the second system, the terminal (e.g. UE) may decide not to respond to the paging message.

In this case, the network node (eg, the AMF node and/or the SMF node) may consider that the paging message delivery has failed when a response to the paging message is not received from the terminal. Then, the network node (eg, an AMF node and/or an SMF node, a UPF node) may retransmit the paging message in a wider area, or may repeatedly transmit the paging message. This may cause waste of paging resources.

In order to solve the waste of paging resources, when the terminal decides not to respond to the paging message, terminal may transmit information that the terminal has received the paging, information that the terminal will not respond to the paging, or information not to transmit the paging message. When the terminal transmits such information, the network node (eg, an AMF node and/or an SMF node, a UPF node) may stop transmitting the paging message. Accordingly, a network node (eg, an AMF node and/or an SMF node, or a UPF node) may efficiently use a paging resource. In addition, the UPF node can effectively process data buffered in the UPF node. For example, when the UPF node receives the information from the terminal, it may delete buffered data.

When the terminal decides not to respond to the paging message, in order for the terminal to transmit information that the terminal has received the paging, information indicating that the terminal will not respond to the paging, or information that not to transmit the paging message anymore, the network node (eg, an AMF node) and/or SMF node, UPF node) and/or terminal may perform operations described below.

For example, when the RAN and/or the network node (eg, the AMF node and/or the SMF node) transmits the paging message, information related to which service/data the paging message is in addition to the paging message may be transmitted. Here, the information related to the paging message for which service/data is information about whether the packet for the aforementioned service has arrived (received), or service information whether the incoming call is a voice call, or a video call, SMS, or other service and the like.

In this case, the RAN may include information about a paging response resource in the paging message. Here, the paging response resource may be a special paging response resource allocated by the RAN in the above-described case. For example, the paging response resource may include a RACH resource preamble allocated in this case.

Upon receiving the paging message, the terminal may check whether there is a message for which the terminal is a recipient in the paging message. If the paging message includes a message for which the terminal is a recipient, the terminal may check information about which service and/or which data the message is for. The terminal may notify the user of information about which service and/or which data it is for.

A user who has checked information about which service and/or which data is for which may decide not to receive data for the paging. Alternatively, when the terminal determines that the checked service and/or data is less important than data communication performed in the first system, it may decide not to receive data for the paging.

When the user or the terminal decides not to receive data for paging, if the paging message includes paging response resource related information, the terminal transmit a response message to the paging message to the RAN by using the paging response resource related information. Here, the response message may include, for example, information indicating that the terminal has received the paging, information indicating that the terminal will not respond to the paging, or information indicating that not to transmit the paging message any more.

The RAN may receive a response message to the paging message through the paging response resource that The RAN has allocated. Then, the RAN may know that the terminal has successfully received the paging. The RAN may inform the core network (eg, AMF node, SMF node, UPF node, and/or PCF node) and the like that the paging message has been successfully delivered to the UE.

After the response message to the paging message is received, if there is no additional access from the terminal, the network (eg, RAN, AMF node, SMF node, UPF node, PCF node, and/or P-CSCF node) may determine that there is no intention to answer incoming data, an incoming call, or the like. Then, data stored (buffered) in the UPF node or the like may be deleted. Alternatively, additionally, the incoming data or the recipient-side IMS server of the incoming call (eg, the P-CSCF node of FIGS. 10 to 11) may inform the caller-side IMS server, network, etc, that the terminal cannot receive data or calls.

4. Fourth Example of the Disclosure of the Present Specification

In the first examples to third examples of the disclosure of the present specification described above, the paging message transmitted by the RAN includes a lot of information. The RAN transmits a paging message containing a lot of information in each cell. Since the paging message is a message that can be received by all terminals of each cell, security such as encryption is not applied to information included in the paging message.

Since security is not applied to information included in the paging message, the paging message may be abused by a terminal other than a terminal that should receive the paging message. Alternatively, when personal information such as sensitive information is included in the paging message, other terminals may receive personal sensitive information. In order to prevent such cases, a method of applying additional security to the paging message will be described. The contents described in the fourth example of the disclosure of the present specification may also be applied to the first to third examples of the disclosure of the present specification.

As a method for applying security to personal information such as sensitive information in a paging message, the terminal may inform the network that whether the terminal supports the security-applied paging message and/or whether the terminal supports the processing of security-applied information in the paging message. For example, when the terminal performs a registration procedure for the network, the terminal may inform whether the terminal supports the paging message to which security is applied and/or whether the terminal supports the processing of information to which security is applied in the paging message. When the network transmits the paging message to the terminal, the security-processed information may be included in the paging message. The security-processed information can be processed only by the network and the terminal.

The following drawings were created to explain an example of the problem to be solved by the disclosure of the present specification. Since the names of specific devices described in the drawings or the names of specific signals/messages/fields are presented by way of example, the technical features of the present specification are not limited to the specific names used in the following drawings.

FIG. 12 shows a signal flow diagram according to a fourth example of the disclosure of the present specification.

Referring to FIG. 12, UE, RAN, AMF/SMF, PCF, and P-CSCF are shown. A UE is an example of a wireless communication device. The RAN may include a base station (eg, gNB, eNB, etc.). AMF/SMF means an AMF node and an SMF node. Although the AMF node and the SMF node are illustrated as one object in FIG. 12, this is only an example, and the AMF node and the SMF node may be implemented as separate objects. Alternatively, the AMF node and the SMF node may be included in one device. PCF may mean a PCF node. The P-CSCF may mean a P-CSCF node and may be included in the IMS network.

The operations performed by the AMF/SMF in FIG. 12 may be operations performed by the AMF node or the SMF node, respectively. The operation performed by the AMF/SMF may be an operation performed after the AMF node and the SMF node communicate with each other. For example, the operation of the AMF/SMF may be an operation performed by the SMF node after the AMF node receives a message from the RAN, the PCF node, and the like and delivers the message to the SMF node. Conversely, the operation of the AMF/SMF may be an operation performed by the AMF node after the SMF node receives a message from the PCF node or the UPF node and the like and delivers the message to the AMF node.

In step S1201, the terminal (eg, UE) may perform a procedure for registering with the system. The terminal may be a terminal supporting Multi SIM. A plurality of SIM cards are mounted in the terminal, and the terminal may perform a registration procedure for a system corresponding to each of the plurality of SIM cards. If the terminal supports an enhanced paging processing function (eg, a function capable of processing encrypted paging information), in the process of performing the registration procedure, the terminal informs that the terminal supports an improved page processing function (eg, function for processing encrypted paging information). In this process, the network also supports an improved page processing function (eg, a function of encrypting a paging message or information included in a paging message), and when the network is decided to use this function for the terminal, the network may notify this to the terminal. For example, the network may transmit information indicating that the network supports the enhanced page processing function to the terminal.

Additionally, when security is applied to paging information (eg, when a paging message or information included in a paging message is encrypted), the network (eg, AMF node) and the terminal may agree on a security environment (eg, encryption key, etc.) used for the paging information. For example, the terminal may transmit information on the desired security environment to the network (eg, an AMF node). Alternatively, the network (eg, an AMF node) may transmit information on the security environment to the terminal.

In step S1202, the terminal may perform an IMS registration procedure. For example, the terminal may perform an IMS registration procedure to perform an IMS service (eg, a voice call service, a vide call service, an SMS service, etc.).

In step S1203, when data (eg, IMS service related data) for the terminal (eg, UE) occurs, the P-CSCF node may receive a SIP invite message. For example, when an incoming call to the terminal is received, the P-CSCF node may receive a SIP invite message. That is, the SIP invite message may be a message corresponding to an incoming call. The P-CSCF may transmit a SIP invite message to the UPF node. The UPF node may transmit a SIP invite message to the AMF node and/or the SMF node.

In step S1204, the AMF node may encrypt personal information such as sensitive information included in the paging message. For example, when the AMF node needs to transmit personal information such as sensitive information (eg, whether an incoming call, service information related to paging, and/or caller number, etc.), the AMF node may encrypt the personal information based on settings such as an security information (e.g. ciphering key, etc.).

In step S1205, the AMF node may transmit a paging message to the terminal via the RAN. The AMF node may transmit the encrypted paging information to the RAN together with the identifier of the incoming terminal. That is, the AMF node may transmit a paging message (including encrypted paging information and an identifier of the called terminal) to the RAN. The RAN may transmit a paging message (including encrypted paging information and an identifier of the incoming terminal) to the terminal.

In step S1206, the terminal may receive a paging message from the RAN. The terminal may decipher the paging message. For example, each terminal may determine whether a paging message is received at a specified time point (eg, a time specified for each UE). When the terminal receives the paging message, the terminal may additionally check whether its identifier is included in the paging message. When there is an identifier of the terminal in the paging message, the terminal may additionally determine whether there is encrypted information in the paging message. If encrypted information is present in the paging message, the terminal may decipher (or decrypt) the encrypted information based on the setting of the security environment (eg, ciphering key, etc.) of step S1201. The terminal may use the deciphered (or decrypted) information.

For reference, in step S1205, the AMF node may transmit a parameter related to security to the RAN. Here, for example, the security-related parameter may be information about setting a security environment (eg, ciphering key, etc.). The RAN may establish a security environment in the RAN based on the security-related parameters. When the RAN needs to include additional information generated by the RAN in the paging message based on the established security environment, the RAN applies security to the additional information generated by the RAN, and then transmits a paging message (including additional information to which security is applied) to the terminal. The terminal may calculate the security environment or parameters that the current RAN can use based on information such as the setting of the security environment (eg, ciphering key, etc.) in step S1201. The terminal may decipher (or decrypt) additional information included in the paging message based on the calculated security environment or parameter.

For reference, the operation of the terminal (eg, UE) described in this specification may be implemented by the apparatus of FIG. 9 and FIGS. 13 to 18 to be described below. For example, the terminal (eg, UE) may be the first wireless device 100 or the second wireless device 200 of FIG. 14. For example, an operation of a terminal (eg, UE) described herein may be processed by one or more processors 102 or 202. The operations of a terminal (eg, UE) described herein may be stored in one or more memories 104 or 204 in the form of instructions/executable code (eg instruction, executable code) executable by one or more processors 102 or 202. One or more processors 102 or 202 control one or more memories 104 or 204 and one or more transceivers 106 or 206, and execute instructions/programs stored in one or more memories 104 or 204 to be used in the present specification. The operation of the UE described in the disclosure may be performed.

In addition, instructions for performing an operation of a terminal (eg, UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the UE described in the disclosure of the present specification.

For reference, the operation of the network node (eg, P-CSCF node, AMF node, SMF node, UPF node, PCF node, etc.) described in this specification may be implemented by the apparatus of FIGS. 13 to 17 to be described below. For example, the network node may be the first wireless device 100 or the second wireless device 200 of FIG. 14. For example, the operation of the network nodes described herein may be handled by one or more processors 102 or 202. The operations of the network nodes described herein may be stored in one or more memories 104 or 204 in the form of instructions/programs (e.g. instructions, executable code) executable by one or more processors 102 or 202. One or more processors 102 or 202 control one or more memories 104 or 204 and one or more transceivers 106 or 206, and execute instructions/programs stored in one or more memories 104 or 204 to be used in the present specification. The operation of the network node described in the disclosure may be performed.

In addition, the instructions for performing the operation of the network node described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the network node described in the disclosure of the present specification.

V. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 13:
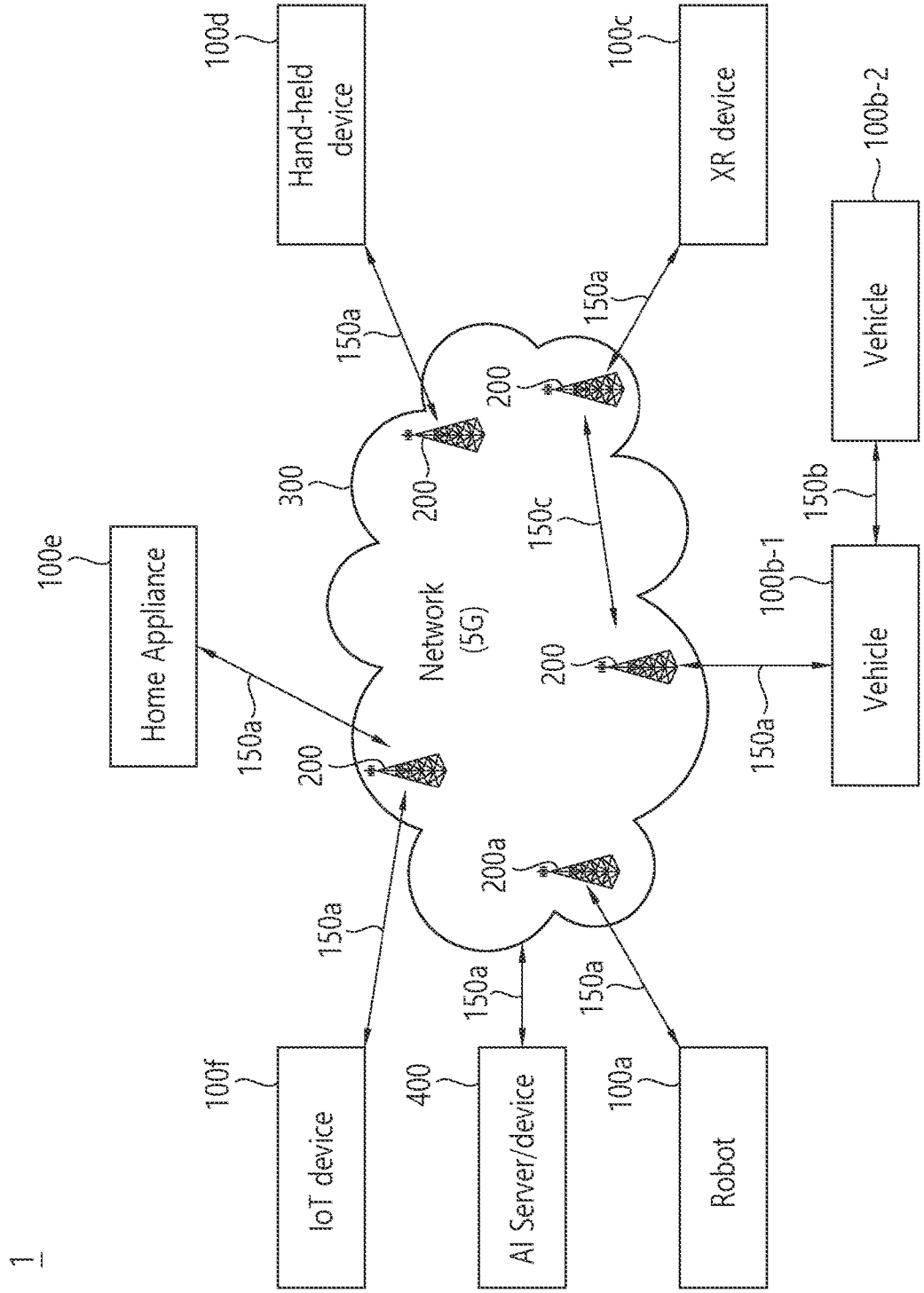
FIG. 13 illustrates a communication system 1 that can be applied to the present specification.

FIG. 13 illustrates a communication system 1 that can be applied to the present specification.

Referring to FIG. 13, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/ wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

FIG. 14 illustrates an example of a wireless device that can be applied to the present specification.

Referring to FIG. 14, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 13}. Alternatively, the first wireless device 100 may correspond to the UE, AMF, SMF, or UPF described in the disclosure of the present specification. In addition, the second wireless device 200 may correspond to a UE, AMF, SMF, or UPF that communicates with the first wireless device 100. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/ signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 15:
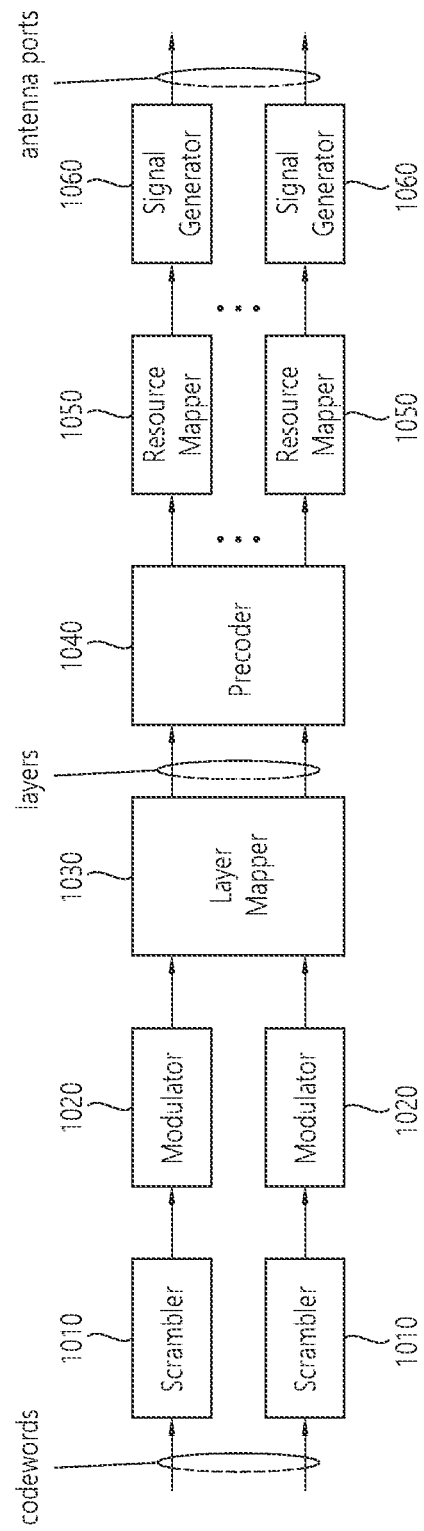
FIG. 15 illustrates an example of a signal processing circuit for a transmission signal that can be applied to the present specification.

FIG. 15 illustrates an example of a signal processing circuit for a transmission signal.

Referring to FIG. 15, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 15 may be performed in the processor (102, 202), the memory (104, 204) and/or transceiver (106, 206) of FIG. 14. The hardware element of FIG. 15 may be implemented in the processors 102 and 202 and/or the transceivers 106 and 206 of FIG. 14. For example, blocks 1010-1060 may be implemented in the processors 102, 202 of FIG. 14. Also, blocks 1010-1050 may be implemented in the processors 102 and 202 of FIG. 14, and block 1060 may be implemented in the transceivers 106 and 206 of FIG. 14.

The codeword may be converted into a wireless signal through the signal processing circuit 1000 of FIG. 15. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 15. For example, a wireless device (e.g., 100 and 200 of FIG. 14) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 16:
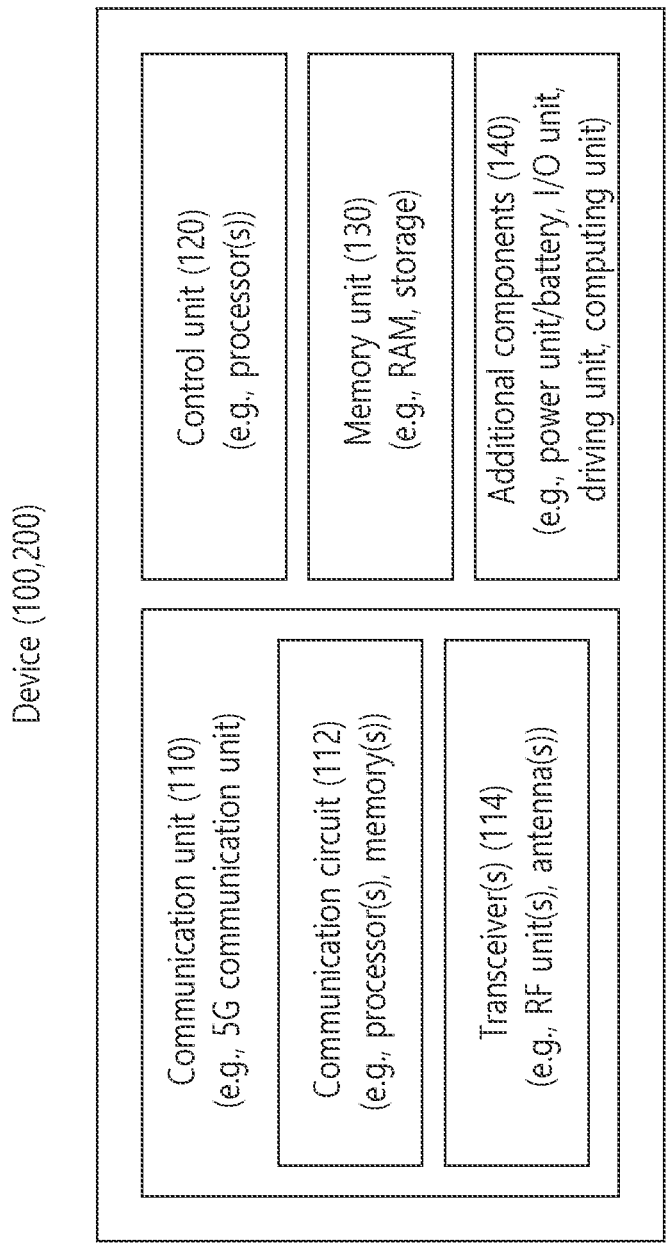
FIG. 16 illustrates another example of a wireless device that can be applied to the present specification.

FIG. 16 illustrates another example of a wireless device that can be applied to the present specification.

The wireless device may be implemented in various forms according to use-examples/services (refer to FIG. 13).

Referring to FIG. 16, the wireless devices 100 and 200 correspond to the wireless devices 100 and 200 of FIG. 14, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 14. For example, the transceiver (s) 114 may include one or more transceivers 106, 206 and/or one or more antennas 108, 208 of FIG. 14.

The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 14. For example, the memory unit 130 may include one or more memories 104 and 204 of FIG. 14.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 13, 100a), a vehicle (FIG. 13, 100b-1, 100b-2), an XR device (FIG. 13, 100c), a portable device (FIG. 13, 100d), a home appliance. (FIG. 13, 100e), IoT devices (FIG. 13, 100f), terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 16, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 17:
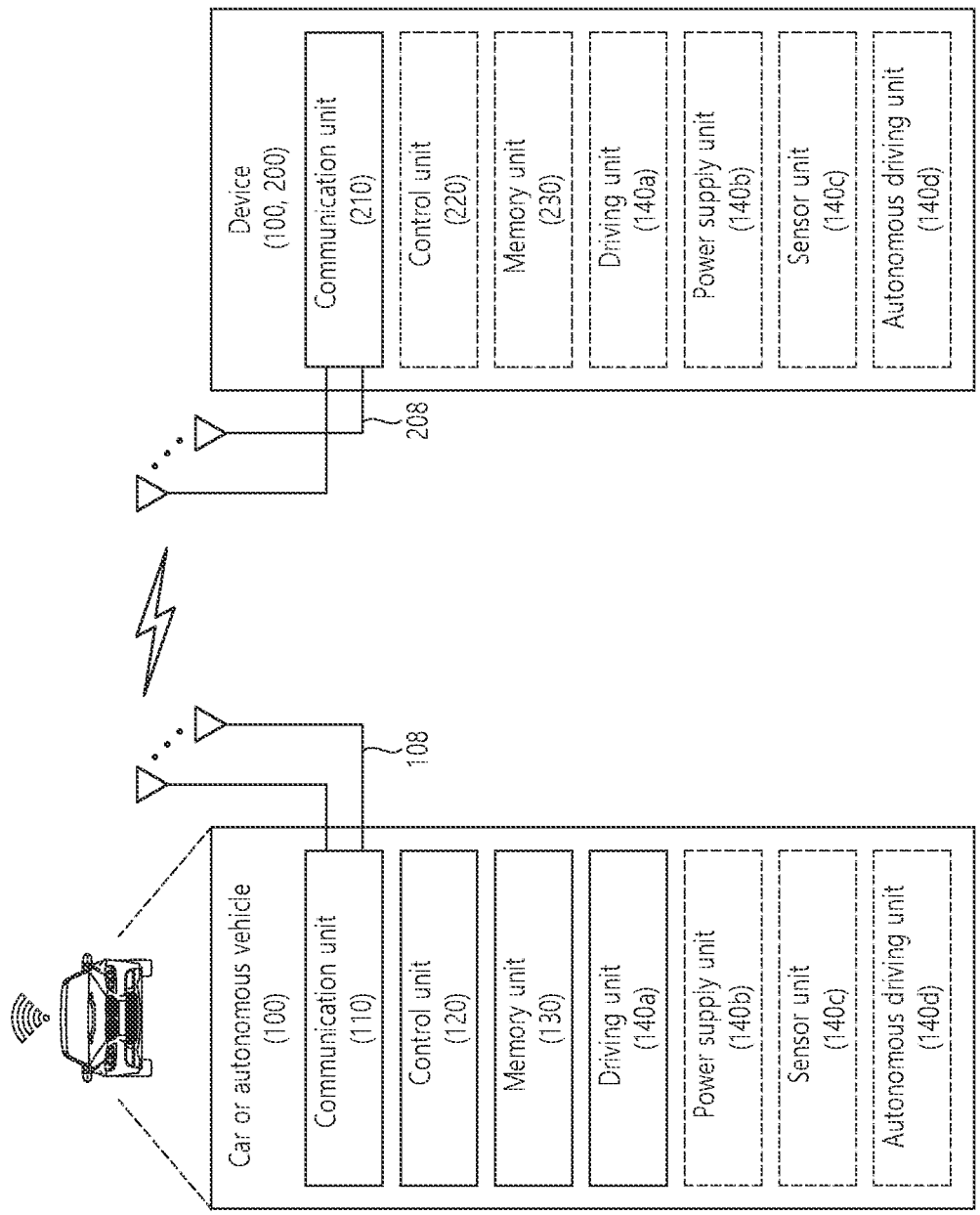
FIG. 17 illustrates an example of a vehicle or an autonomous vehicle that can be applied to the present specification.

FIG. 17 illustrates an example of a vehicle or an autonomous vehicle that can be applied to the present specification.

FIG. 17 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 17, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 16, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 18:
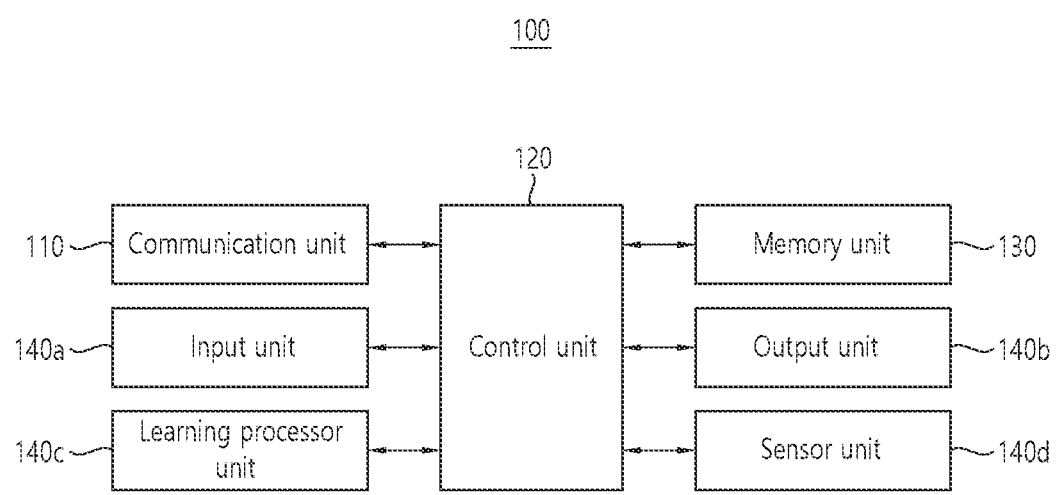
FIG. 18 illustrates an example of an AI device that can be applied to the present specification.

FIG. 18 illustrates an example of an AI device that can be applied to the disclosure of the present specification.

FIG. 18 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 18, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 16.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 13) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 13, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing communication related to Internet Protocol Multimedia Subsystem (IMS), the method performed by a network node and comprising:
   receiving first information indicating that the terminal requests information related to an incoming IMS service;
   receiving a Session Initiation Protocol (SIP) message related to the IMS service for the terminal;
   transmitting second information related to the incoming IMS service for the terminal to a Policy Control Function (PCF) node based on the first information and based on that the SIP message has received; and
   transmitting the SIP message to a User Plane Function (UPF) node,
   wherein the SIP message is used by the UPF node to transmit a data notification message to at least one of the Session Management Function (SMF) node and/or the Access and Mobility Management Function (AMF) node, and
   when one of the SMF node and/or the AMF node transmits a paging message to the terminal based on the data notification message, wherein the second information is used to transmit information related to an IMS service for the terminal to the terminal.

2. The method of claim 1, wherein the first information includes information that a plurality of Subscriber Identity Modules (SIMs) are used.

3. The method of claim 1, wherein the SIP message includes an IMS Communication Service Identifier (ICSI), and wherein the method further comprises:
   determining the type of the incoming IMS service based on the ICSI; and
   wherein the information on the type of the incoming IMS service is transmitted to the PCF together with the second information.

4. The method of claim 1,
   wherein the SIP message includes caller information of the incoming IMS service, and
   wherein the caller information of the incoming IMS service is transmitted to the PCF together with the second information.

5. The method of claim 1, further comprising:
   receiving a response message of the terminal to the paging message from the UPF node or the PCF node.

6. The method of claim 5,
   wherein the response message includes information indicating that the terminal rejects the IMS service for the terminal, and
   wherein the response message is received from the PCF node.

7. The method of claim 1, further comprising:
   generating an association with the PCF using an AA-Request (AAR)/AA-Answer (AAA) message.

8. The method of claim 1, wherein the first information is received while the registration procedure for the IMS network is performed.

9. A method for a terminal to perform communication, the method comprising:
   receiving a paging message from a base station;
   determining whether to respond to the paging message; and
   transmitting a response message to the paging message, based on that the terminal supports multiple subscriber identity modules (SIMs), when it is determined not to respond to the paging message, wherein the respond message include information that the terminal does not want to respond to the paging message.

10. The method of claim 9, wherein the paging message includes information on a random access channel (RACH) resource preamble (preamble) allocated for the response message.

11. The method of claim 10, wherein the paging message is characterized is transmitted through the RACH resource preamble.

12. A wireless communication device comprising:
   at least one processor; and
   at least one memory for storing instructions and operably electrically connectable to the at least one processor;
   wherein operations performed based on the execution of the instructions by the at least one processor include:
   receiving a paging message from a base station;
   determining whether to respond to the paging message; and
   transmitting a response message to the paging message, based on that the terminal supports multiple subscriber identity modules (SIMs), when it is determined not to respond to the paging message, wherein the respond message include information that the terminal does not want to respond to the paging message.

13. The method of claim 12, wherein the wireless communication device is an autonomous driving device that communicates with at least one of a mobile terminal, a network, and an autonomous vehicle other than the wireless communication device.

* * * * *